(12) United States Patent
Carrubba

(10) Patent No.: US 10,982,888 B2
(45) Date of Patent: Apr. 20, 2021

(54) REFRIGERANT CHARGING ASSEMBLIES AND METHODS OF USE

(71) Applicant: ENERGIZER AUTO, INC., St. Louis, MO (US)

(72) Inventor: Vincent Carrubba, Baldwin, NY (US)

(73) Assignee: ENERGIZER AUTO, INC., St. Louis, MO (US)

( * ) Notice: Subject to any disclaimer, the term of this patent is extended or adjusted under 35 U.S.C. 154(b) by 140 days.

(21) Appl. No.: 16/149,900

(22) Filed: Oct. 2, 2018

(65) Prior Publication Data

US 2019/0032977 A1 Jan. 31, 2019

Related U.S. Application Data

(63) Continuation of application No. 13/663,764, filed on Oct. 30, 2012, now Pat. No. 10,113,780.

(60) Provisional application No. 61/559,366, filed on Nov. 14, 2011.

(51) Int. Cl.
*F25B 45/00* (2006.01)
*F16K 1/30* (2006.01)
*F16L 29/00* (2006.01)

(52) U.S. Cl.
CPC ............. *F25B 45/00* (2013.01); *F16K 1/308* (2013.01); *F16L 29/007* (2013.01); *F25B 2345/001* (2013.01); *F25B 2345/003* (2013.01); *F25B 2345/004* (2013.01); *F25B 2345/006* (2013.01)

(58) Field of Classification Search
CPC ............................ F25B 45/00; F25B 2345/00; F25B 2345/001; F25B 2345/003; F25B 2345/004; F25B 2345/006; F16K 1/308; F16K 29/007
See application file for complete search history.

(56) References Cited

U.S. PATENT DOCUMENTS

| | | |
|---|---|---|
| 2,456,913 A | 12/1948 | Buttner et al. |
| 2,757,964 A | 8/1956 | Both et al. |
| 2,822,961 A | 2/1958 | Seaquist |
| 2,925,103 A | 2/1960 | Kerr et al. |
| 2,956,708 A | 10/1960 | Nusbaum |
| 3,029,981 A | 4/1962 | Webster et al. |
| 3,131,733 A | 5/1964 | Monahon |
| 3,155,292 A | 11/1964 | Webster |
| 3,258,160 A | 6/1966 | Allen |
| 3,357,601 A | 12/1967 | Crawford et al. |
| 3,384,133 A | 5/1968 | Gordon |
| 3,448,779 A | 6/1969 | Horwitt |
| 3,452,906 A | 7/1969 | Daniels |
| 3,554,227 A | 1/1971 | Yocum |
| 3,578,788 A | 5/1971 | Potter, Jr. et al. |
| 3,648,893 A | 3/1972 | Whiting |

(Continued)

*Primary Examiner* — David J Teitelbaum
(74) *Attorney, Agent, or Firm* — Armstrong Teasdale LLP

(57) ABSTRACT

Refrigerant charging systems and methods of use are described herein. A refrigerant charging system may include a conduit, a valve releasably connectable to the outlet portion and coupled to a first end of the conduit; and a disconnect coupler fitting connected to a second end of the conduit. The disconnect coupler fitting may include a control structure positioned in a hollow body that, during use, allows refrigerant flow to the refrigerant circuit. The control structure may include one or more openings that allow controlled leakage of fluid from the refrigerant charging assembly when the refrigerant charging assembly is disconnected from at least the refrigerant service unit.

20 Claims, 13 Drawing Sheets

(56) References Cited

U.S. PATENT DOCUMENTS

| | | |
|---|---|---|
| 3,664,557 A | 5/1972 | Bruce |
| 3,759,291 A | 9/1973 | Moore et al. |
| 3,785,163 A | 1/1974 | Wagner |
| 3,815,534 A | 6/1974 | Kneusel |
| 3,817,302 A | 6/1974 | Kowal et al. |
| 3,851,796 A | 12/1974 | Moos |
| 3,866,804 A | 2/1975 | Stevens |
| 3,907,012 A | 9/1975 | Burke |
| 3,976,110 A | 8/1976 | White |
| 3,977,560 A | 8/1976 | Stumpf et al. |
| 3,998,274 A | 12/1976 | Liautaud |
| 4,054,163 A | 10/1977 | Brown, Jr. et al. |
| 4,059,858 A | 11/1977 | Lambel et al. |
| 4,110,998 A | 9/1978 | Owen |
| 4,281,775 A | 8/1981 | Turner |
| 4,313,306 A | 2/1982 | Torre |
| 4,431,117 A | 2/1984 | Genbauffe et al. |
| 4,494,570 A | 1/1985 | Adkins |
| 4,535,802 A | 8/1985 | Robertson |
| 4,545,759 A | 10/1985 | Giles et al. |
| 4,644,982 A | 2/1987 | Hatch |
| 4,662,393 A | 5/1987 | Genbauffe et al. |
| 4,697,611 A | 10/1987 | Winland et al. |
| 4,753,267 A | 6/1988 | Starr et al. |
| 4,869,300 A | 9/1989 | Gudenau et al. |
| 4,903,741 A | 2/1990 | Ibanez |
| 4,948,041 A | 8/1990 | McCauley |
| 4,971,224 A | 11/1990 | Scremin |
| 4,995,417 A | 2/1991 | Naku |
| 5,022,423 A | 6/1991 | Britt |
| 5,070,917 A | 12/1991 | Ferris et al. |
| 5,080,132 A | 1/1992 | Manz et al. |
| 5,183,189 A | 2/1993 | Baudin |
| 5,211,317 A | 5/1993 | Diamond et al. |
| 5,232,124 A | 8/1993 | Schneider et al. |
| 5,234,019 A | 8/1993 | Forner |
| 5,246,045 A | 9/1993 | Clothier et al. |
| 5,248,125 A | 9/1993 | Fritch et al. |
| 5,293,902 A | 3/1994 | Lapierie |
| 5,295,502 A | 3/1994 | Lane |
| 5,305,925 A | 4/1994 | Vogel |
| 5,329,975 A | 7/1994 | Heitel |
| 5,355,830 A | 10/1994 | deJong |
| 5,356,045 A | 10/1994 | Parks et al. |
| 5,388,417 A | 2/1995 | Hughes, Jr. et al. |
| 5,407,096 A | 4/1995 | Smith |
| 5,415,329 A | 5/1995 | Westlund |
| 5,485,872 A | 1/1996 | Kerger |
| 5,609,195 A | 3/1997 | Stricklin et al. |
| 5,626,173 A | 5/1997 | Groult |
| 5,765,601 A | 6/1998 | Wells et al. |
| 5,827,050 A | 10/1998 | Price |
| 5,848,740 A | 12/1998 | Burghaus |
| 5,875,638 A | 3/1999 | Tinsler |
| 5,967,204 A | 10/1999 | Ferris et al. |
| 5,975,151 A | 11/1999 | Packo |
| 5,975,356 A | 11/1999 | Yquel et al. |
| 6,016,934 A | 1/2000 | Moriguchi |
| 6,030,662 A | 2/2000 | Marecki |
| 6,058,960 A | 5/2000 | Kopp |
| 6,079,444 A | 6/2000 | Harris et al. |
| 6,089,032 A | 7/2000 | Trachtenberg |
| 6,155,066 A | 12/2000 | Chandler et al. |
| 6,253,970 B1 | 7/2001 | Kohn et al. |
| 6,296,228 B1 | 10/2001 | Knowles et al. |
| 6,360,554 B1 | 3/2002 | Trachtenberg |
| 6,360,795 B1 | 3/2002 | Bothe et al. |
| 6,385,986 B1 | 5/2002 | Ferris et al. |
| 6,438,970 B1 | 8/2002 | Ferris et al. |
| 6,467,283 B1 | 10/2002 | Trachtenberg |
| 6,481,221 B2 | 11/2002 | Ferris et al. |
| 6,510,968 B2 | 1/2003 | Tsutsui et al. |
| 6,539,970 B1 | 4/2003 | Knowles et al. |
| 6,539,988 B1 | 4/2003 | Cowen et al. |
| 6,561,237 B1 | 5/2003 | Brass et al. |
| 6,595,486 B2 | 7/2003 | Chen |
| 6,609,385 B1 | 8/2003 | Ferris et al. |
| 6,648,035 B1 | 11/2003 | Cowen et al. |
| 6,698,466 B1 | 3/2004 | Cowan et al. |
| 6,719,002 B2 | 4/2004 | Shaw |
| 6,722,141 B2 | 4/2004 | Ferris et al. |
| 6,789,581 B2 | 9/2004 | Cowen et al. |
| 6,796,340 B1 | 9/2004 | Ferris et al. |
| 6,837,401 B2 | 1/2005 | Groys |
| 6,880,733 B2 | 4/2005 | Park |
| 6,898,979 B2 | 5/2005 | Cowen et al. |
| 6,978,636 B2 | 12/2005 | Motush et al. |
| 7,077,171 B2 | 7/2006 | Carrubba |
| 7,107,781 B2 | 9/2006 | Quest et al. |
| 7,124,598 B2 | 10/2006 | Quest et al. |
| 7,260,943 B2 | 8/2007 | Carrubba et al. |
| 7,275,383 B2 | 10/2007 | Motush et al. |
| 7,565,829 B2 | 7/2009 | Quest et al. |
| 7,565,830 B2 | 7/2009 | Quest et al. |
| 7,673,497 B2 | 3/2010 | Quest et al. |
| 9,709,307 B2 | 7/2017 | Carrubba et al. |
| 2004/0060605 A1 | 4/2004 | Jhurani |
| 2004/0079092 A1 | 4/2004 | Ferris et al. |
| 2004/0118673 A1 | 6/2004 | Foster et al. |
| 2004/0168463 A1 | 9/2004 | Dudley |
| 2007/0284461 A1 | 12/2007 | Alexander et al. |
| 2008/0022701 A1 | 1/2008 | Carrubba |
| 2009/0113901 A1 | 5/2009 | Carrubba et al. |
| 2011/0041522 A1 | 2/2011 | Carrubba |
| 2012/0192576 A1 | 8/2012 | Carrubba |
| 2012/0324920 A1 | 12/2012 | Carrubba |
| 2015/0184911 A1 | 7/2015 | Pistone et al. |
| 2015/0308679 A1 | 10/2015 | Pistone et al. |
| 2016/0003509 A1 | 1/2016 | Pistone et al. |
| 2017/0284716 A1 | 10/2017 | Carrubba et al. |

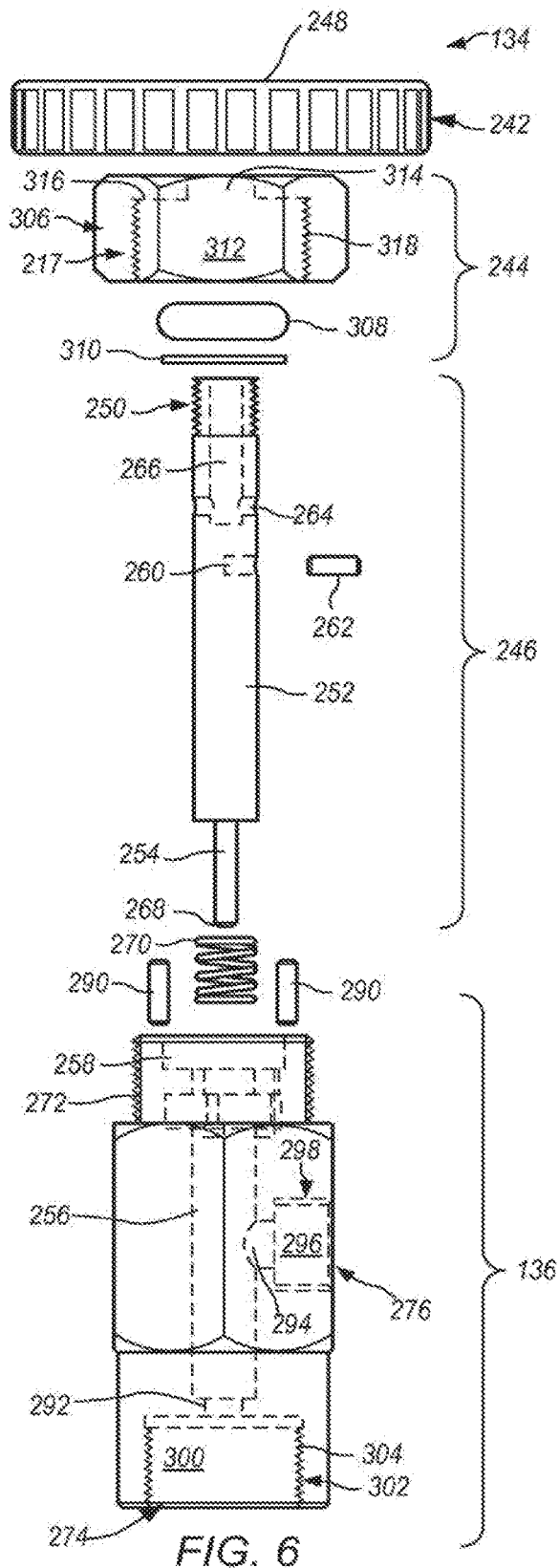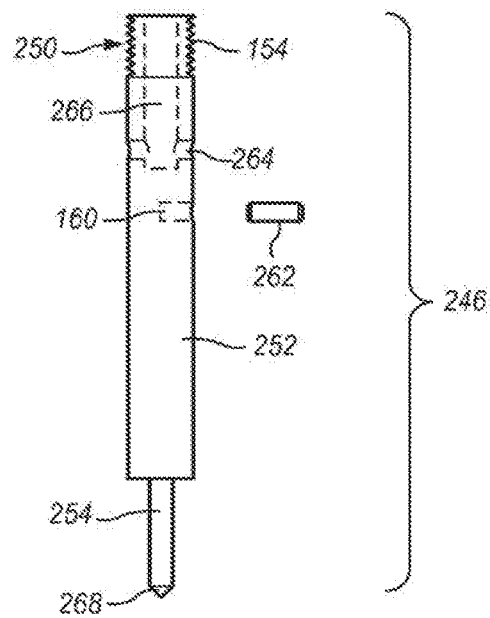
FIG. 6
FIG. 7

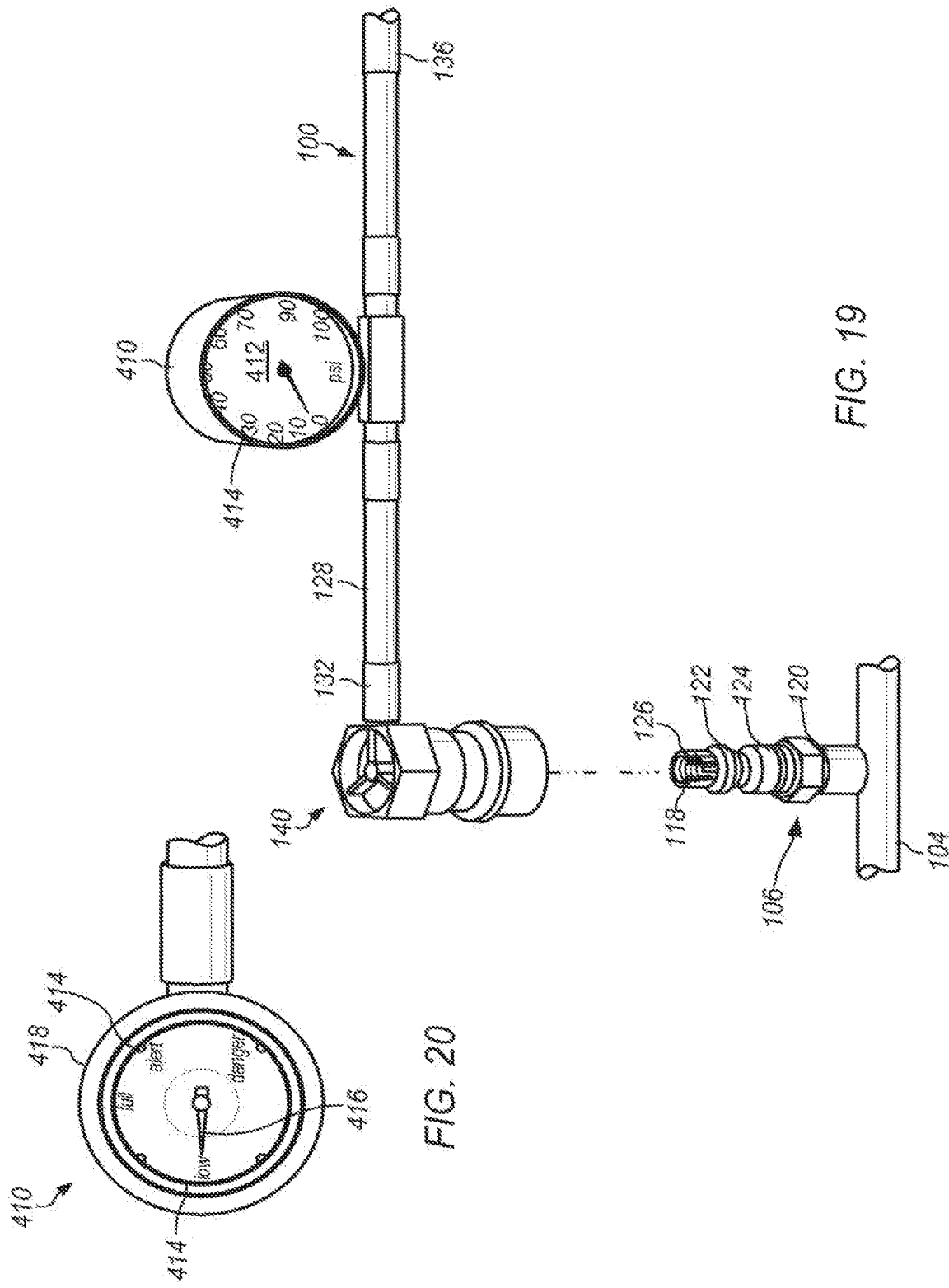

REFRIGERANT CHARGING ASSEMBLIES AND METHODS OF USE

RELATED APPLICATION

The present application is a continuation of U.S. patent application having Ser. No. 13/663,764 filed on Oct. 30, 2012, and entitled "REFRIGERANT CHARGING ASSEMBLIES AND METHODS OF USE," wherein the entirety of said U.S. patent application is incorporated herein by reference in its entirety.

U.S. patent application having Ser. No. 13/663,764 filed on Oct. 30, 2012, and entitled "REFRIGERANT CHARGING ASSEMBLIES AND METHODS OF USE" claims the benefit of U.S. Provisional Application having Ser. 61/559,366 entitled "REFRIGERANT CHARGING ASSEMBLIES AND METHODS OF USE" filed on Nov. 14, 2011.

BACKGROUND

1. Field of the Invention

The present invention generally relates to air conditioning apparatus. More particularly, the invention relates to a charging hose assembly for adding refrigerant to an air conditioning refrigerant circuit from a canister containing pressurized refrigerant.

2. Description of the Relevant Art

A common technique for adding a relatively small quantity of refrigerant to a refrigerant circuit of an air conditioning system, for example an automotive vehicle air conditioning system, is to interconnect a charging assembly between a suction line service fitting on the refrigerant circuit, and a small canister filled with pressurized refrigerant, and then flow at least some of the
refrigerant from the canister into the circuit during operation of the system.

U.S. Pat. No. 6,385,986 to Ferris et al, which is incorporated herein by reference, describes a refrigerant charging hose assembly that has an aerosol shut-off valve connectable to a refrigerant canister and interconnected to a disconnect coupler fitting by a length of refrigerant charging hose, the body portion of the coupler fitting being economically formed from high tensile strength elastomeric plastic material.

U.S. Pat. No. 6,089,032 to Trachtenberg and U.S. Pat. No. 6,467,283 to Trachtenberg, both of which are incorporated herein by reference, describe kits and methods for retrofitting air conditioners that includes an adapter configured to be convertible to the service port of an automobile air conditioner wherein both the first and second containers may be hooked up to the auto air conditioner via the same service port adapter.

U.S. Pat. No. 6,880,587 to Carter et al., which is incorporated herein by reference, describes a refrigerant material transfer device for transferring refrigerant from a pressurized container to the connector on an automotive air conditioning system that includes an actuator, fluid conveying tube, and a quick connect fitting for attachment to the automotive connector.

U.S. Pat. No. 6,978,636 to Motush et al. and U.S. Pat. No. 7,275,383 to Motush et al, which is incorporated herein by reference, describe portable devices for measuring the refrigerant pressure in an automobile air conditioning system and, if needed, charging the system with additional refrigerant. An actuator is coupled to a pressurized container that selectively opens the container valve.

U.S. Pat. No. 7,260,943 to Carrubba et al. and U.S. Patent Application Publication Nos. 2008-0022701 to Carrubba et al. and 2009-0113901 to Carrubba et al., which are incorporated herein by reference as fully set forth herein, describe various apparatus that may allow a consumer to measure the refrigerant pressure in an automobile air conditioner and to add refrigerant as needed.

Although hose assemblies for refrigerant products are known, however, due to chemical exposure and/or environmental conditions many of these refrigerant charging assemblies that include hoses deteriorate over time. Furthermore, as regulations change, not all refrigerant charging assemblies will work with refrigerant cans containing an integrated valve. Accordingly, there is a need for more durable refrigerant charging assemblies and/or refrigerant charging assemblies that enable various styles of valves/attachments to be coupled to containers having integrated valves.

SUMMARY

Refrigerant charging systems and methods are described herein. In some embodiments, a refrigerant charging assembly includes a conduit; a valve releasably connectable to the outlet portion and coupled to a first end of the conduit; and a disconnect coupler fitting connected to a second end of the conduit.

In some embodiments, a refrigerant charging system includes a conduit having first and second ends, a valve releasably connectable to the outlet portion and coupled to the first end of the conduit, a disconnect coupler fitting connected to the second end of the conduit, and a pressure gauge connected in the conduit and between the valve and the disconnect coupler fitting.

In some embodiments, the disconnect coupler fitting includes a hollow body releasably connectable to a refrigerant circuit service fitting having a depressible opening pin therein, and a control structure positioned in the hollow body that, during use, allows refrigerant flow to the refrigerant circuit. The control structure includes one or more openings that allow controlled leakage of fluid from the refrigerant charging assembly when the refrigerant charging assembly is disconnected from at least the refrigerant service unit.

In some embodiments, a method of servicing a refrigerant service unit includes providing a refrigerant charging assembly having a conduit, a valve releasably connectable to the outlet portion and coupled to a first end of the conduit, and a disconnect coupler fitting connected to a second end of the conduit; allowing fluid to flow from the refrigerant source, through the refrigerant charging assembly, and to refrigerant service unit; disconnecting the refrigerant charging assembly from at least the refrigerant service unit; and allowing controlled leakage of fluid from the refrigerant charging assembly.

In some embodiments, a refrigerant charging apparatus includes a conduit having first and second ends, a servicing device comprising a valve at least partially disposed in a passage of the servicing device, a first portion of the valve being engagable with a fluid source, wherein the servicing device valve is adjustable between a released position and an engaged position; and disconnect coupler fitting comprising a control structure positioned in a body of the disconnect couple such that, during use, allows refrigerant flow to the refrigerant circuit, wherein the control structure comprises one or more openings that allow controlled leakage of fluid from the refrigerant charging assembly when the refrigerant charging assembly is disconnected from at least the refrigerant service unit.

In some embodiments, a refrigerant charging apparatus includes a conduit having first and second ends, a servicing device comprising a valve at least partially disposed in a passage of the servicing device, a first portion of the valve being engagable with a fluid source. The servicing device valve is adjustable between a released position and an engaged position. When in an engaged position the servicing device valve may be locked.

In further embodiments, features from specific embodiments may be combined with features from other embodiments. For example, features from one embodiment may be combined with features from any of the other embodiments.

In further embodiments, treating a subsurface formation is performed using any of the methods, systems, power supplies, or heaters described herein.

In further embodiments, additional features may be added to the specific embodiments described herein.

BRIEF DESCRIPTION OF THE DRAWINGS

FIG. 6 is an exploded side view of an embodiment of a dispensing valve portion of the charging hose assembly.

FIG. 7 is a perspective view of an embodiment of a plunger.

FIG. 19 depicts a side view of an embodiment of a refrigerant charging assembly that includes a pressure gauge.

FIG. 20 depicts a front view of the pressure gauge depicted in FIG. 8

Figure 1:
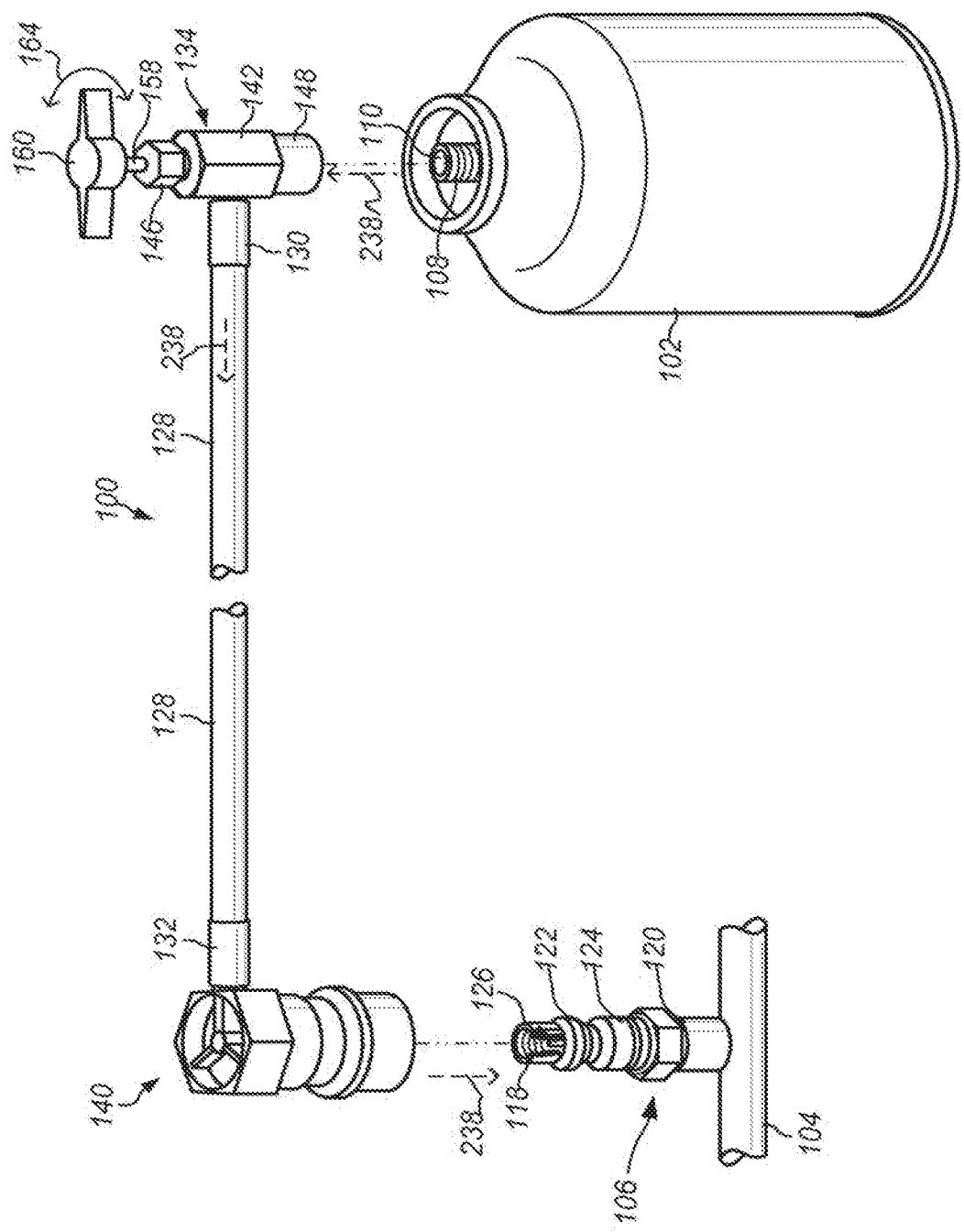
FIG. 1 depicts an exploded view of an embodiment of a refrigerant charging assembly coupled to a refrigerant fluid source having a pierceable seal and a service fitting of a refrigerant service unit.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As used herein, the singular forms "a", "an" and "the" include plural referents unless the content clearly indicates otherwise. Thus, for example, reference to "a valve" includes a combination of two or more valves. The term "include", and derivations thereof, mean "including, but not limited to".

"Bias member" refers to any member of the system, device, or apparatus that exerts a force in a particular direction(s).

"Body" refers to any physical structure capable of at least partially supporting another object. A body may have various regular or irregular shapes. For example, portions of a body may be straight, curved, or a combination of both.

"Charging" refers to both charging and recharging of a system. Charging a system may include initially filling a unit with fluid (for example, refrigerant). Recharging may refer to adding fluid to a unit that has some fluid in the unit. Recharging may be performed after a portion of the fluid has leaked out of the unit or the pressure/amount of the fluid has dropped below a desirable level. It will be appreciated that charging and recharging are often used interchangeably.

"Coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

"Coupling element" refers to any physical structure or combination of structures capable of releasably or permanently connecting two objects. Examples of a coupling element include, but are not limited to, a hook, a clip, a clasp, mating threads, one or more members of an interference fitting, one or more members of a welded joint, one or more members of a quick coupling joint, and any combination of such elements.

"Fluid" refers to a liquid, gas, vapor, or a mixture thereof.

"Member" refers to a constituent part of a system. A member may include a plate, link, rod, or other structure of various sizes, shapes, and forms. A member may be a single component or a combination of components coupled to one another. A member may have various regular or irregular shapes. For example, portions of a member may be straight, curved, or a combination of both.

"Opening" refers to an aperture, such as a hole, gap, slit, or slot.

In charging an automobile refrigeration system, a charging assembly may be used. Typically a charging assembly may include (1) a length of conduit; (2) a valve connected to one end of the conduit, and (3) a disconnect coupler fitting connected to the opposite end of the conduit. The conduit is, in some embodiments, a hose suitable for refrigerant use and has a length of less than about twelve inches. The valve may be a shut-off type valve that has a plunger suitable to open a seal and/or pierce a seal of a refrigerant fluid source. To use the charging assembly, the valve is connected to a cylindrical outlet portion of a refrigerant source, and the disconnect coupler fitting is releasably locked onto the service fitting of a refrigerant service unit. When attaching the disconnect coupler fitting to the service fitting, a fixed pin member within the coupler fitting depresses a corresponding opening pin within the service fitting to communicate the interior of the refrigerant circuit with the interior of the conduit.

Next, the vehicle's engine is started, and the air conditioning system is operated in its maximum cooling mode. A handle on the valve is then rotated in a first direction to cause an associated valve stem portion of the valve to pierce or engage the outlet portion of the fluid source. In embodiments when a piercing type valve is used, the handle is rotated in the opposite direction to communicate the interior of the fluid source (refrigerant canister) with the interior of the conduit to allow fluid (refrigerant) to flow from the fluid source into the refrigerant circuit.

The flow of refrigerant from the refrigerant source is typically regulated via a valve. In the case of an aerosol can of refrigerant, a valve is often threaded or otherwise attached to an outlet at a top end of the container. In embodiments when a plunger connects with a self-sealing valve of the fluid source, after the valve is turned sufficiently to communicate the interior of the fluid source with the interior of the conduit, fluid (refrigerant) flows from the fluid source through the conduit into the refrigerant system. In some aerosol systems, the integrated valve may include a spring-loaded gating device that is depressed to open and close the container. To stop the flow of fluid, the gating device is released, closing the integrated valve, thereby stopping or reducing the flow of fluid. In embodiments, when a push button valve is used, the push button may be depressed and held to open the seal of the refrigerant source to allow fluid to flow from the fluid source through the conduit to the refrigerant system.

To terminate the refrigerant charging process, the handle of the valve is rotated or the push button is released to close the valve and thereby inhibit the flow through the conduit of any pressurized refrigerant remaining in the fluid source. The disconnect coupler fitting is then removed from the refrigerant circuit service fitting. If the fluid source has been completely emptied of refrigerant in this process, the shut-off valve may be removed from the fluid source and the empty fluid source may be disposed under the proper environmental regulations.

Once the charging assembly is removed from the fluid source and the refrigerant circuit service fitting, the charging assembly may be stored. In some embodiments, the charging assembly may be stored in non-climate controlled units. In some instances, the refrigerant charging assembly may remain attached to the fluid source. Residual material (for example, refrigerant and/or additives) from the refrigerant fluid source may remain in the conduit. Exposure of the conduit (hose) to temperatures above the vapor pressure of the contents of the can may cause the fluids in the hoses to expand and, thus cause the hose to expand. Expansion of the hose may lead to leaks, cracks, and/or breakage of the hose rendering the refrigerant charging assembly ineffective and/or nonuseable.

In some embodiments, the disconnect coupler fitting may include one or more openings that allows controlled leakage of fluids (for example, refrigerant and/or refrigerant mixtures) from the refrigerant charging assembly. Controlled leakage of the fluids from the refrigerant charging assembly inhibits degradation of the hoses and/or limit heat expansion of the conduit.

Thus, the life of the conduit (for example, refrigerant hose) is extended. A disconnect coupler that allows controlled leakage may inhibit a higher-volume, sudden discharge of refrigerant as compared to a conventional coupler. For example, the openings in the disconnect coupler fitting allows less gas to be released than a conventional open coupler at the same hose pressure. Release of less gas may create less blow-back and/or less loose-spraying in the event of an accident or inadvertent misuse than a conventional open coupler. Thus, environmental, safety, and economical advantages may be realized as compared to a conventional open coupler.

Figure 2:
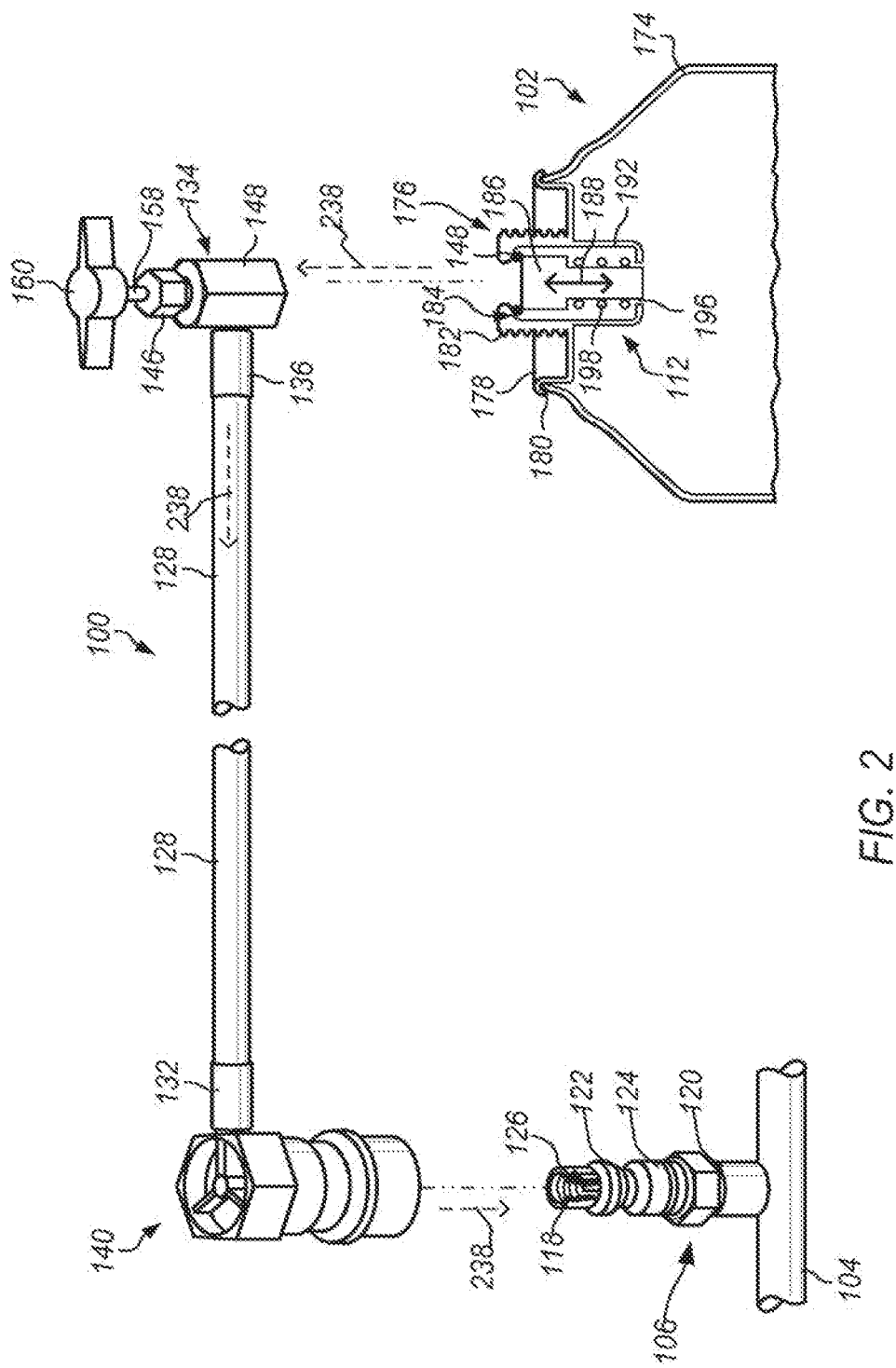
FIG. 2 depicts an exploded view of an embodiment a refrigerant charging assembly coupled to a refrigerant fluid source having a gating device and a service fitting of a refrigerant service unit.
Figure 3:
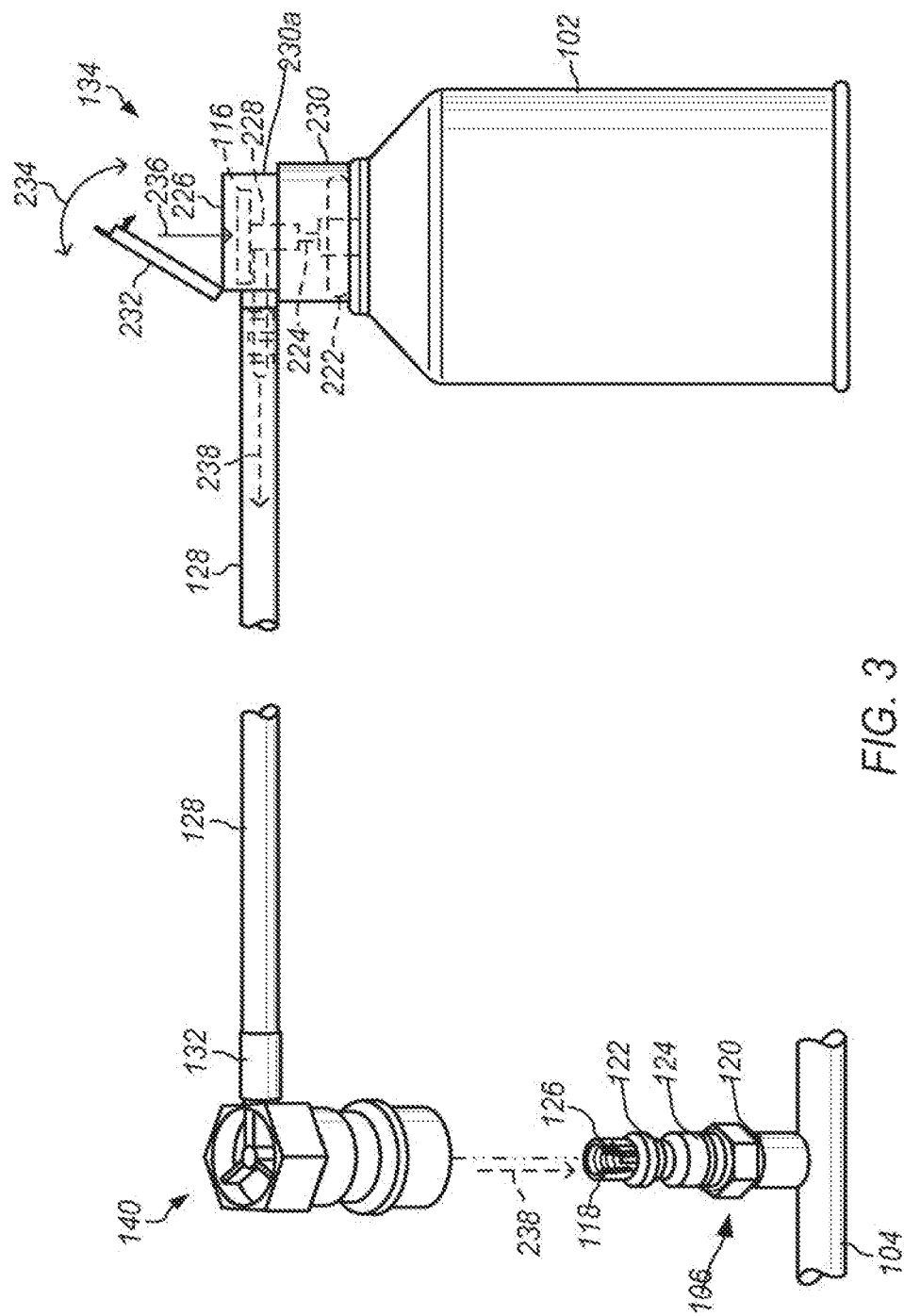
FIG. 3 depicts an exploded view of an embodiment a refrigerant charging assembly coupled to a refrigerant fluid source having a push button valve and a service fitting of a refrigerant service unit.

FIGS. 1 and 2 depict exploded views of embodiments of refrigerant charging assembly coupled to a fluid source and a service fitting of a refrigerant service unit. Refrigerant service unit may include, but is not limited to, an automobile refrigerant system, a residential refrigerant system, or a commercial refrigeration system. FIG. 3 depicts a side view of refrigerant assembly coupled to a fluid source having a push button type valve. In FIGS. 1-3 refrigerant charging assembly 100 is useable to allow flow of fluid (for example, refrigerant) from fluid source 102 to a receiving system (for example, a refrigeration service unit) 104 via low side refrigerant circuit service fitting 106. In the case of charging an automobile refrigerant system, a pressurized refrigerant source, such as an aerosol can of refrigerant, may be connected via refrigerant charging assembly 100 to a service fitting of an automotive vehicle air conditioning system.

Refrigerants include, but are not limited to, hydrocarbons, halogenated hydrocarbons, ammonia, water, or the like. Halogenated hydrocarbons include, but are not limited to, fluorinated hydrocarbons, chlorinated, fluorinated hydrocarbons, fluorinated ethers, 2,3,3,3-tetrafluorprop-1-ene (HFO-1234yf), 1,1,1,2-tetrafluorethane, dichlorodifluoromethane, or mixtures thereof. Commercially available fluid sources include, but are not limited to, HFO-1234yf refrigerants (for example, Genetron® (Honeywell, USA), Opteon™ (DuPont™, USA)), R-134a, R-12, or the like. In some embodiments, fluid source 102 may also include other suitable chemicals including, but not limited to, dyes, antifoamants, and/or system lubricants.

Fluid source 102 may be any suitable shape or size and/or may be composed of one or more suitable materials. Fluid source 102 may have a shape that is easily grasped by a human hand, sufficient size to contain a desired volume of fluid; and/or may be composed of a material having sufficient mechanical properties to withstand the static force of a pressurized fluid.

In certain embodiments, fluid source 102 is a portable container. A portable container includes, but is not limited to, a can, a cylinder, or a reservoir that is easily handled by a user. In some embodiments, fluid source 102 includes, but is not limited to, a stationary reservoir, such as a large tank or similar container. Fluid source 102 may be pressurized or, in some embodiments, under a vacuum. In some embodiments, fluid source 102 is at atmospheric pressure. In an embodiment, fluid source 102 is an aerosol container of R-134a refrigerant or HF01234fy refrigerant. Fluid source 102 may include an integrated valve or a seal that requires puncturing in order to be opened. In some embodiments, fluid routing system 100 may alternatively, or additionally, be configured to transfer fluid from fluid receiving system 104 to fluid source 102.

In FIG. 1, fluid source 102 has, at its top end, an upwardly projecting, externally threaded cylindrical outlet portion 108 with top end wall 110. Top end wall 110 may be pierced and/or punctured. In FIG. 2, fluid source 102 has, at its top end, integrated valve 112. In some embodiments, integrated valve 112 is a self-sealing valve. In some aerosol systems, the integrated valve may include a spring-loaded gating device that is depressed to open and close the container. To stop the flow of fluid, the gating device is released, closing the integrated valve, thereby stopping or reducing the flow of fluid.

In FIG. 3, fluid source 102 has, at its top end, has a conventional push-button type aerosol shut-off valve servicing device 134 operatively connected to fluid source 102. Servicing device 134 may be removably snap-fittable onto the upper end of fluid source 102. As shown, servicing device 134 includes push button 116. To control the flow of fluid, push button 116 is depressed or released. Other push button type of configurations known in the art for delivering fluids may be used.

Referring to FIGS. 1-3, and 19, service fitting 106 is of a hollow, generally tubular configuration and has an open inlet end 118, an axially spaced pair of annular exterior flange portions 120 and 122, and a reduced diameter annular exterior locking recess 124 disposed between the flanges 120 and 122. Coaxially disposed within the body of the service fitting 106 is a spring-loaded opening pin secured to an internal valve member. The opening pin 126 may resiliently biased upwardly to a closed position as shown in FIGS. 1-3, and 19. The associated valve member closes off the interior of the fitting 106 to prevent refrigerant flow outwardly therethrough. Vertical depression of the pin 126, on the other hand, opens the interior of the service fitting body to permit refrigerant flow therethrough.

The refrigerant charging hose assembly 100 includes a length of fluid transfer member 128 having tubular connector fittings 130 and 132 directly coupled or secured to its opposite ends. Fluid transfer member 128 may include any device or structure capable of supporting fluid flow. For example, fluid transfer member 128 may include, but is not limited to, a flexible or rigid hose, a conduit, a pipe, a tube, and the like. For example, a hose with appropriate tubular connector fittings (couplings) connects to servicing device 104 and an inlet of a refrigeration system. Fluid transfer member 128 may include openings of any suitable shape or size to allow pressurized fluid to enter and/or exit the fluid transfer member at a desired rate of flow.

Figure 15:
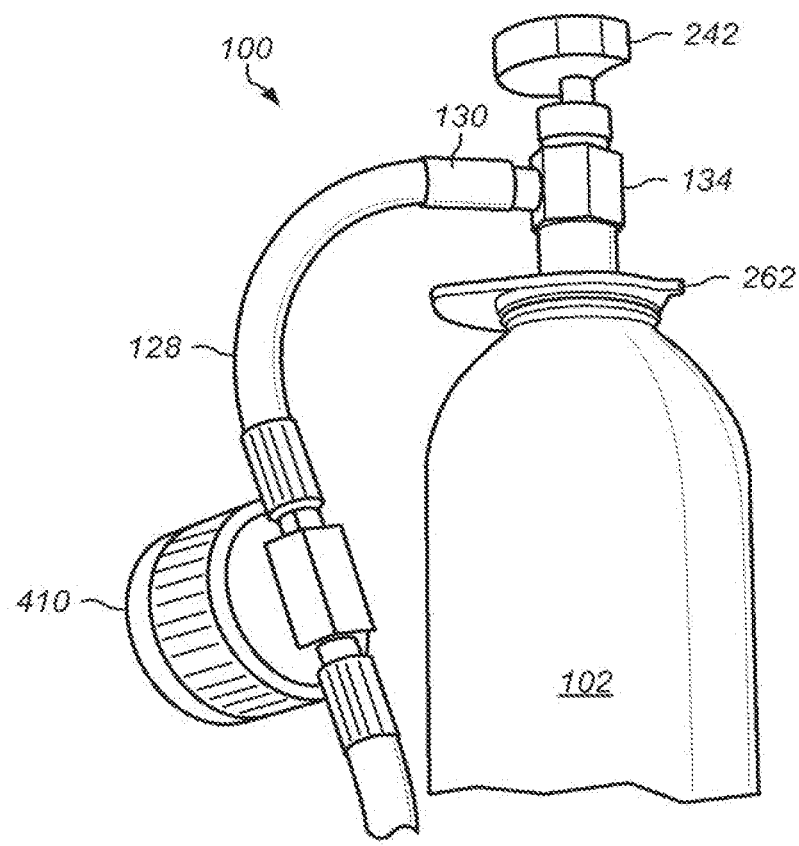
FIGS. 15 and 16 depict perspective views of refrigerant charging assemblies that include locking servicing device.
Figure 16:
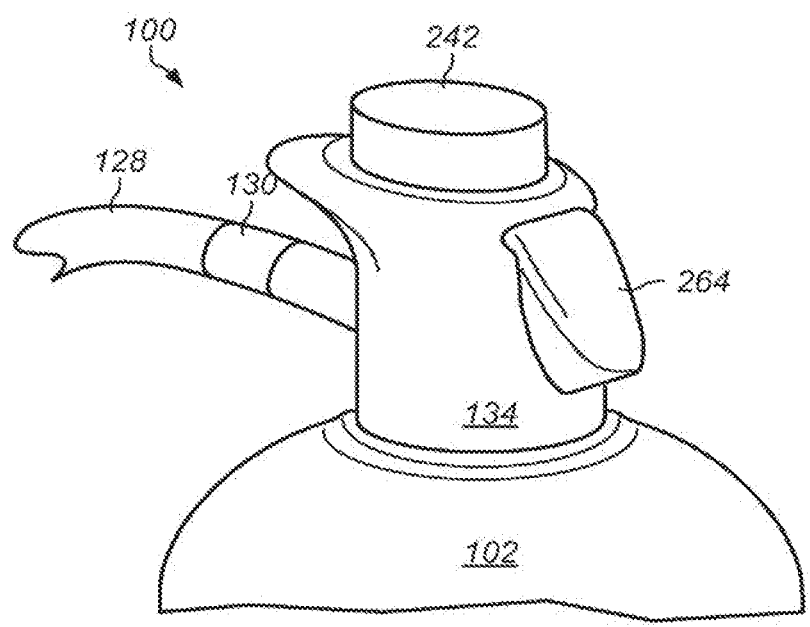

The tubular connector fittings may be metal, plastic, or made from materials known in the art. As shown in FIG. 1, fitting 130 may be directly coupled and/or permanently anchored to servicing device 134 operatively and releasably connectable to the fluid source outlet portion 108. As shown in FIG. 1, servicing device 134 is a threaded stem valve. As shown in FIG. 2, and FIGS. 15 and 16 fitting 130 may be directly coupled and/or permanently anchored to servicing device 134 operatively and releasably connectable to the fluid source 102. As shown in FIGS. 3, 15, and 16, fitting 130 is permanently anchored to servicing device 134, which is directly coupled and/or permanently anchored to fluid source 102. In some embodiments, servicing device 134 is a shut-off type valve. When servicing device 134 is a shut-off type valve, the length of the fluid transfer member 128 is less than twelve inches.

Fitting 132 is directly coupled to disconnect coupler fitting 140 operatively and releasably connectable to service fitting 106. When refrigerant charging assembly 100 is operatively interconnected between fluid source 102 and service fitting 106, assembly 100 is operative to allow fluid to flow from the fluid source 102 into refrigerant service unit 104 via fluid transfer member 128.

Figure 4:
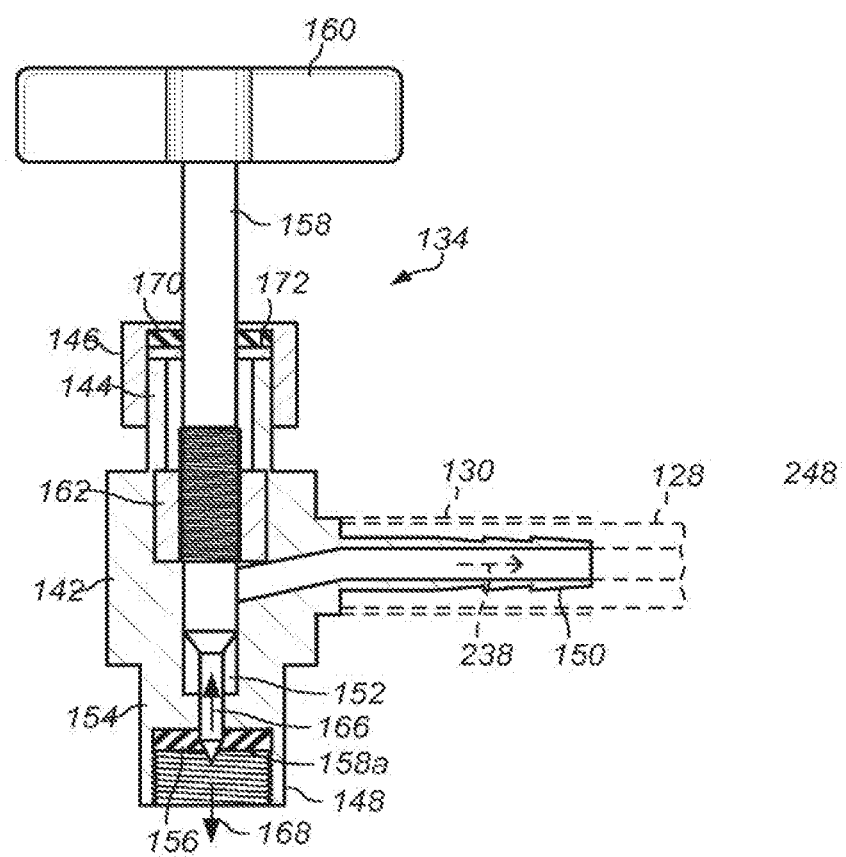
FIG. 4 depicts a cross-sectional view an embodiment of a dispensing valve portion of the charging hose assembly.

Referring to FIGS. 1 and 4, servicing device 134 has hollow, generally tubular body portion 142 with upper end 144 closed by nut member 146. Nut member 146 may secure to upper end using threads. Internally tubular bottom inlet end portion 148 may be thread onto refrigerant source outlet portion 108 (see, for example, FIG. 1). Barbed side outlet portion 150 may be received in and permanently anchored to end portion of fluid transfer member 128 by tubular metal connector fitting 130. The interior of bottom inlet end portion 148 communicates with axial interior passage 152 within the body portion 142, with passage 152 communicating, in turn, with the interior of side outlet portion 150.

Coaxially disposed within inlet end portion 148 is annular support flange portion 154 having annular resilient sealing gasket 156 on its bottom side. Vertically oriented valve stem (plunger) 158, having transverse handle portion 160 secured to its upper end, may be secured (for example, using threads) to tubular insert 162 coaxially anchored within the interior of body portion 142. Using handle 160 to rotate the plunger 158 about its longitudinal axis, as indicated by double-ended arrow 164 (shown in FIG. 1), servicing device 134 may be selectively oriented in (1) an open, refrigerant flow permitting position in which plunger 158 is shifted upwardly within body 142 (as indicated by arrow 166 in FIG. 4), or (2) a closed, refrigerant flow shut-off position in which plunger 158 is downwardly shifted (as indicated by the arrow 168 in FIG. 4) in which pointed lower end 158a of the plunger extends downwardly through and beyond gasket 156. Upper end portion of stem 158 extends through annular rubber and metal gaskets 170, 172 retained in an upper interior portion of nut member 146.

Figure 5:
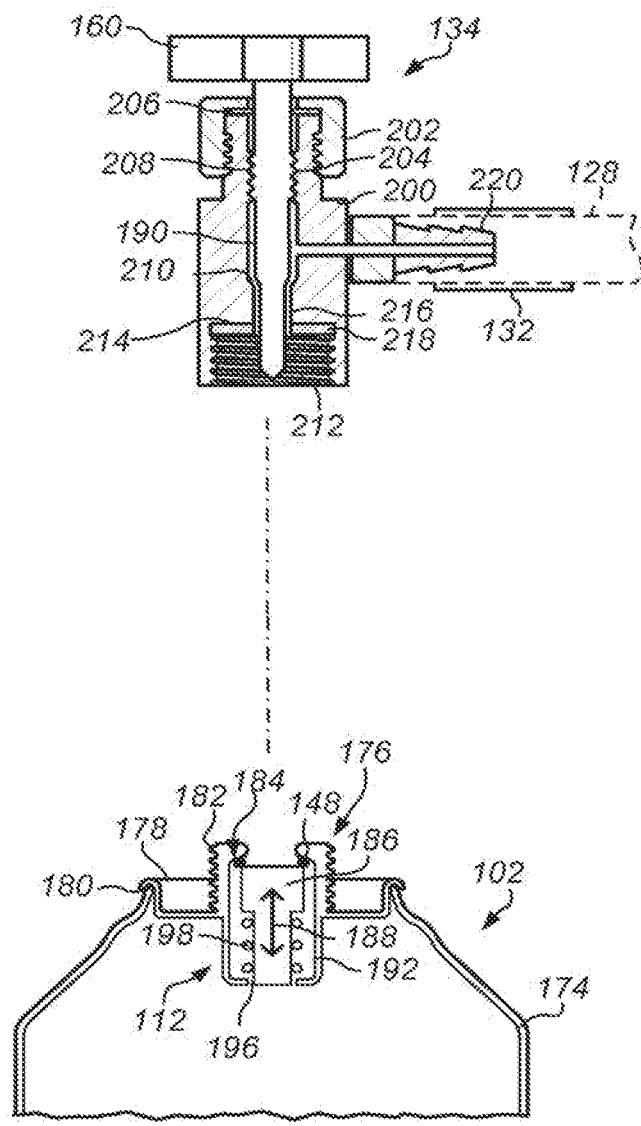
FIG. 5 depicts a cross-sectional exploded view of an embodiment of a refrigerant charging assembly coupled to a refrigerant fluid source having a gating device.

Referring to FIGS. 2 and 5, servicing device 134 is coupled to fluid source 102. Fluid source 102 includes fluid source body 174, fluid source port 176 and integrated valve 112. Integrated valve 112 may be partially positioned in fluid source body 174 and fluid source port 176. In some embodiments, fluid source port 176 may include a unitary assembly, including integrated valve 112, coupled to a top end of fluid source body 174. In some embodiments, integrated valve 112 is a self-sealing valve (SSV).

Fluid source port 176 may include lip 178. Lip 178 may round or curl over ends 180 of fluid source body 174. In some embodiments, lip 178 may be coupled over ends 180 via a press-fit, an adhesive, soldering, welding, or the like. In some embodiments, a gasket, or similar sealing device may be provided between lip 178 and ends 180 to provide a seal between the two.

Coupling element 182 (for example, external thread) extends upward from fluid source port 176 (for example, from the top end of the outlet). In some embodiments, coupling element 182 includes a V2 inch (about 1.27 cm) ACME external thread or an ISO metric trapezoidal thread having a 30 degree thread angle. Coupling elements include, but are not limited to, various types and sizes of threads, detent feature, or the like. Channel 184 may be provided between lip 178 and coupling element 182. Channel 184 may accommodate/receive a portion of a device that is coupled to fluid source outlet 116. For example, channel 184 may be sized to accommodate the outside diameter of servicing device 134.

Integrated valve 112 may include gating device 186. In some embodiments, gating device 186 is a spring-loaded plunger. Gating device may be manipulated between an opened and closed position. For example, gating device 186 may be translated longitudinally between a closed position and an opened position as shown by arrow 188. As shown, gating device is in a closed position. Gating device 186 may be engaged/moved by an external device, such as plunger 190 of servicing device 134. In some embodiments, the gating device and the plunger have complimentary dimensions.

Gating device 186 may be disposed in bore 192 of integrated valve 112. A seal may be coupled to gating device 186 may seal against an inside annular surface of bore 192 when the plunger is disposed in a closed position. When moved downward, toward an opened position, a lower end portion of gating device 186 moves through opening 196, and the seal moves away from the inside annular surface of bore 192, thereby allowing refrigerant to flow from an interior of fluid source body 174 through bore 192 of fluid source port 176. In some embodiments, gating device 186 is biased in the opened or closed position. As shown, gating device 186 is biased into a closed position via a biasing member 198. In some embodiments, biasing member 198 includes a compressed coil spring.

It should be understood that fluid source port 176 may include various other configurations. For example, coupling element 182 may include an internal-thread, detent features, or the like, that provide for coupling to fluid source port 176. Further, embodiments of fluid source port 176 may include various configurations of integrated valves including other configurations of a plunger or similar sealing mechanism, such as those used in various types of aerosol type valves.

In some embodiments, servicing device 134 includes body 200. In some embodiments, servicing device 134 may include a pressure gauge. In some embodiments, handle 160 may be used to operate servicing device 134. In some embodiments, handle 160 may be integrated with a pressure gauge and/or temperature gauge, or similar devices. Handle 160 may be coupled to plunger 190. In some embodiments, handle 160 may include ridges and/or other features that allow a user to grip and rotate plunger 190 to actuate servicing device 134. Servicing device 134 may be coupled to handle 160 to allow the plunger to rotate when the handle is turned. In some embodiments, plunger 190 may be permanently coupled to handle 160. For example, plunger 190 may be bonded (for example, glued, epoxied, or welded) to handle 160. Plunger 190 may be made of materials chemically inert to refrigerant (e.g., stainless steel or aluminum). Plunger 190 may have a blunt end. In some embodiments, plunger 190 has an end capable of piercing seals of refrigerant sources and also be capable of engaging a seal of a self-sealing valve without damaging the self-sealing valve.

Plunger 190 and handle 160 may be coupled to valve body 200 with nut 202. Nut 202 may be a retainer nut. An inside diameter of a portion of nut 202 may be slightly larger than the outside diameter of plunger 190 to allow nut 202 to move freely up and down the body of the plunger. A portion of nut 202 may have an inside diameter that is less than a diameter of plunger 190 at threads 204 to inhibit the nut from passing over the threads.

Gasket 206 may be located inside nut 202 to provide a seal between plunger 190, nut 202, and valve body 200 of servicing device 134. Gasket 206 may be made of one or more materials that are chemically inert to fluid in servicing device 134.

Threads 204 may engage threads 208 of valve body 200 so that rotation of valve handle 160 rotates plunger 190. Rotation of plunger 190 may cause the plunger to move along threads 208 and translate relative to valve body 200. As plunger 190 translates relative to valve body 200, the valve plunger may form a seal when pressed against seat 210. A portion of plunger 190 that presses against seat 210 may be complementary to the shape of the seat to allow a tight seal to be formed between the valve plunger and the seat. Sealing plunger 190 against seat 210 may provide a closed position that inhibits flow of fluids between a source (for example, fluid source 102) and charging assembly coupled to servicing device 134. Thus, servicing device 134 may operate as a shutoff valve between fluid source 102 and refrigeration system 104. Plunger 190 may engage gating device 186 and moves the gating device into an open position (for example, moves gating device 186 in FIGS. 2 and 5 downward). In some embodiments, advancement of servicing device 134 onto fluid source 102 engages plunger 190 with gating device 186 to open the gating device. In some embodiments, plunger 190 may have an end that is capable of engaging a gating device and piercing a seal. Having a plunger that may be used for both types of cans may allow one type of charging assembly to be used with many different types of containers with various types of seals.

Servicing device 134 may include may include coupling element 212 complementary to the coupling element 182 of fluid source 102 (for example, an internal thread of the adapter that mates with an external thread of the fluid source). As shown, a cavity including coupling element 212 (internal threads) that terminates into shoulder 214. Shoulder 214 includes a radially extending flat surface that necks down into bore 216 through valve body 200. In some embodiments, valve shoulder 214 engages (for example, depresses) gating device 186.

Servicing device 134 includes a gasket 218. Gasket 218 may be used to provide a seal between the valve body and devices mated with the valve inlets and/or outlets. Gasket 218 may be used to provide a seal between valve body 200 and a device mated with valve inlet. Gasket 218 may contact or otherwise provide an intermediate interface between shoulder 214 and a top end of coupling element 178. Gasket 218 may include a rubber/metal disc washer, o-ring, or the like. Gasket 218 may be made of one or more materials that are chemically inert to fluid from the refrigerant container. In some embodiments, gasket 218 is shoulder 214. In some embodiments, gasket 218 is omitted.

Servicing device 134 may be coupled to (for example, threaded onto) coupling element 182 of fluid (for example, refrigerant) source port 176. In some embodiments, coupling element 212 is selected to be the same size and type as that used with certain refrigerant containers. For example, coupling element 212 may be complementary to threading used on an R-134a refrigerant container. In certain embodiments, coupling element 212 is a V2 inch (about 1.27 cm) ACME female-thread or an International Standard Organization ("ISO") metric trapezoidal thread having a 30 degree thread angle. Plunger 190 may align with gating device 140 when servicing device 134 is coupled to refrigerant source 102.

Servicing device 134 includes a barbed side outlet portion 220 received in and permanently anchored to an end portion of the fluid transfer member 128 by the tubular metal connector fitting 130.

In some embodiments, fluid source 102 includes servicing device 134 as shown in FIG. 3. Fluid source includes a non-threaded outlet portion 222 from which a spring-loaded, resiliently depressible fluid source discharge tube 224 upwardly projects. Servicing device 134 may be removably snap-fittable onto the upper end of fluid source 102 and has push button 116 disposed at open upper end 226 of servicing device 134 and secured to an underlying inlet tube 228. Tube 228 may sealingly fit over fluid source discharge tube 224. Hollow, barbed outlet tube 230 may be transversely secured to inlet tube 228, communicates with its interior, and extends into the right end of charging fluid transfer member 128.

In some embodiments, fluid source 102 includes a hinged lid. As shown in FIG. 3, hinged lid 232 may be secured to upper end 226 of servicing device 134 and is pivotable, as indicated by double-ended arrow 234, between an open position (as shown in FIG. 3) in which the push button 116 is exposed, and a closed position (not shown) in which lid 232 releasably snaps onto tubular base portion 230a of servicing device 134 and covers push button 116.

Fluid may be forced from fluid source 102 into a refrigerant system (e.g. a/c system) simply by depressing push button 116 as indicated by the arrow 236. Push button 116 depresses fluid source outlet tube 218, thereby causing pressurized fluid from within fluid source 102 to sequentially flow upwardly through the interiors of tubes 218, 222, and 224 and into the interior of a right end portion of the charging fluid transfer member 128 for delivery into the refrigerant system 104. The flow of pressurized fluid (shown by arrow 238) through the fluid transfer member 128 may be terminated by simply releasing push button 116. Release of push button 116 may permit fluid source outlet tube 218 to be upwardly spring-driven back to a closed position. The use of push-button servicing device 134 at the fluid source end of the charging
assembly 100 augments the fluid flow shut-off function of the disconnect coupler fitting 140 in that fluid outflow from fluid source 102 is terminated in response to release of push button 116.

Figure 8:
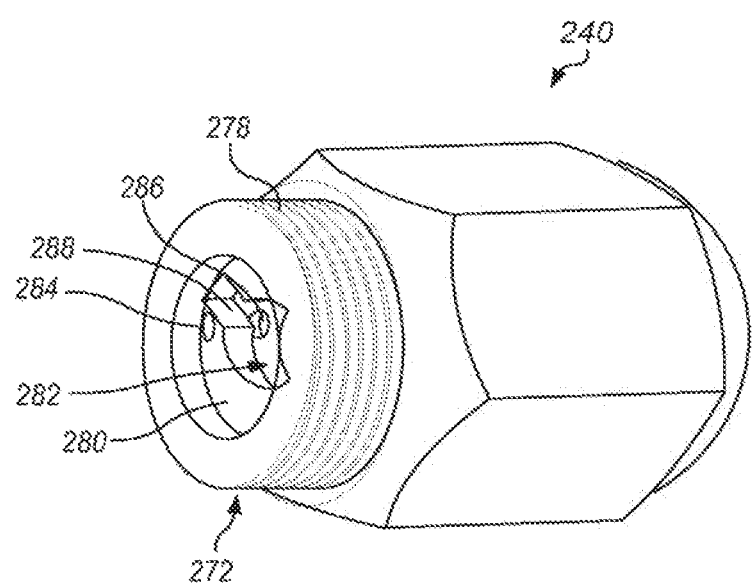
FIG. 8 is a perspective view of an embodiment of a dispensing valve portion.

In some embodiments, FIGS. 6-8 depict embodiments of servicing device 134 that locks. FIG. 6 is an exploded side view of an embodiment of servicing device 134 that locks. FIG. 7 is a perspective view of an embodiment of a plunger of servicing device 134. FIG. 8 is a perspective view of an embodiment of servicing device body 240.

Referring to FIG. 6 servicing device 134 may include actuator 242, coupling member 244, plunger 246, and servicing device body 240. Actuator 242 may be permanently or releasably coupled to plunger 246. Actuator 242 may include handle 248 and/or measuring device 146. Handle 248 may include any physical features (for example, ridges, non-slip coating, etc.) that facilitate gripping and/or handling. In some embodiments, the handle may include gripping elements and an opening (not shown). The opening may include a coupling element for coupling handle 248 to an external device or structure. For example, the coupling element may include a set of interior threads arranged in a selected thread pattern. In some embodiments, the coupling element of handle 248 is at least substantially complementary to a coupling element of plunger 246. For example, the set of interior threads of handle 248 may be at least substantially complementary to exterior threads of plunger 246. During use, actuator 242 may be utilized to actuate servicing device 134. For example, a user grasps or manipulates handle 248 to adjust integrated valve 112 from a closed position to an opened position or vice versa when servicing device 134 is coupled to fluid source 102.

In some embodiments, actuator 242 (handle) may be integrated with a measuring device. The measuring device may include, but is not limited to, a pressure gauge, a temperature gauge, and/or one or more similar devices. In some embodiments, actuator 242 is in fluid communication with servicing device body 240, such that the measuring device may provide fluid property readings (for example, temperature and/or pressure readings, etc.) in connection with the fluid flowing through or suspended in servicing device body 240. For example,
measuring device 146 may provide fluid property readings in connection with fluid receiving system 104. In certain embodiments, measuring device 146 may provide fluid property readings in connection with fluid source 102.

Actuator 242 may be directly coupled, releasably coupled, or an integral part of plunger 246. Plunger 246 includes coupling element 250, plunger body 252, and plunger shaft 254. Coupling element 250 may releasably couple plunger 246 to an external device or structure (for example, actuator 242). Coupling element 250 may directly couple (for example, glued or welded) or be integral with plunger body 252. Coupling element 250 may include exterior threads arranged in a selected pattern. In some embodiments, coupling element 250 is at least
substantially complementary to a coupling element of actuator 242. For example, exterior threads of coupling element 250 of may be at least substantially complementary to a set of interior threads of handle 248.

Plunger body 252 may be any suitable shape or size. For example, plunger body 252 may be at least substantially cylindrical. In some embodiments, plunger body 252 is at least partially disposed in bore 256 of servicing device body 240. Plunger body 252 may be inserted through opening 258 such that at least a portion of the plunger body is disposed in bore 256. Opening 258 may allow fluid communication between second fluid port 276. In some embodiments, when actuator 242 (handle) is integrated with measuring device 146, opening 258 allows fluid communication between second fluid port 276. An actuator with an integrated measuring device is described in co-pending U.S. patent application Ser. No. 13/365,006 to Carrubba, filed Jul. 10, 2012, which is incorporated by reference herein in its entirety. The diameter of plunger body 252 may be at most slightly less than the diameter of bore 256 such that an annulus is formed between an outer surface of the plunger body and an inner surface of the bore. The annulus may be in fluid communication with fluid receiving system 104 and fluid source 102. In some embodiments, a fluid may flow in a substantially axial direction through the annulus. Fluid may flow from fluid source 102 through bore 256 and then to fluid receiving system 104.

Plunger body 252 may include radial opening 260, radial protrusion 262, radial passage 264, and passage 266. Radial opening 260 may be any suitable shape or size. Radial opening 260 may be at least substantially circular having a diameter of sufficient size to receive at least a portion of radial protrusion 262. In some embodiments, when plunger body 252 is at least
partially disposed in bore 256, radial passage 264 may be in fluid communication with the annulus formed between the outer surface of the plunger body and the inner surface of the bore. Plunger passage 266 may be in fluid communication with radial passage 264. For example, axial passage 266 may intersect radial passage 264. In some embodiments, radial passage may allow fluid to vent from servicing device 134 when plunger 246 is disengaged.

Plunger body 252 may be directly coupled (for example, welded or glued) or integral with plunger shaft 254. Plunger shaft 254 may be permanently or releasably coupled to plunger body 252. Plunger shaft 254 may be any suitable shape or size. Plunger shaft 254 may be at least substantially cylindrical, and have a diameter at least slightly less than the smallest diameter of bore 256. A portion of plunger shaft 254 may be engageable with at least a portion of integrated valve 112. For example, plunger shaft 254 may include end 268 having an end surface at least substantially complementary to gating device 186 of integrated valve 112. In some embodiments, plunger end 268 includes a blunt end surface for pressing against gating device 186 of integrated valve 112. In some embodiments, engaging a portion of plunger end 268 with
the portion of integrated valve 112 adjusts the integrated valve from a closed position to an opened position. Opening of integrated valve 112 allows fluid to flow from fluid source 102 through bore 256 and then to fluid receiving system 104.

In some embodiments, simultaneous engagement of the first portion of plunger 246 with integrated valve 112, and the second portion of the plunger with servicing device body 240 and/or an additional member of servicing device 134 suspends the integrated valve in an opened position to allow continuous fluid communication between fluid source 102 and the servicing device body. In certain embodiments, simultaneous engagement of the first and second portions of plunger 246 as described above allows continuous fluid communication between fluid source
102 and fluid receiving system 104 through servicing device 134. For example, pressing plunger end 268 against gating device 186 of integrated valve 112 with sufficient force may adjust the integrated valve from a closed position to an opened position. In some embodiments, disengaging plunger end 268 from the portion of integrated valve 112 may adjust the integrated
valve from an opened position to a closed position.

As shown in FIG. 7, plunger end 268 includes a tapered end configured to break a seal of a fluid source by piercing a hole in the seal. In some embodiments, the taper end may be sharp. For example, the tapered end may be used for piercing a hole in a seal of a refrigerant container having an ACME type top. In some embodiments, force may be applied to the plunger to assist in piercing a seal of a refrigerant container to open the container to allow fluid to flow from first fluid source 102 through servicing device 134, and then to fluid receiving system 104. In some embodiments, the plunger end 268 and/or plunger shaft 254 are hollow.

Plunger 246 may include bias member 270. In some embodiments, bias member 270 includes a spring element. Bias member 270 may exert a force against at least a portion of plunger 246. Bias member 270 may also exert a force against at least a portion of servicing device body 240. In some embodiments, bias member 270 exerts substantially equal and opposite forces on respective portions of plunger 246 and servicing device body 240. As shown, bias member 270 is disposed axially between plunger body 252 and servicing device body 240. In some embodiments, bias member 270 urges plunger 246 apart from a surface of servicing device body 240. During use, when servicing device 134 is coupled to fluid source 102, bias member 270 may urge plunger shaft 254 apart from integrated valve 112. Such separation may inhibit unintentional opening of the integrated valve 112.

Plunger 246 may be inserted into servicing device body 240. Referring to FIG. 6 and FIG. 8, servicing device body may include opening 258, coupling element 272, bore 256, first fluid port 274, and second fluid port 276. Servicing device body 240 may be any suitable shape or size. As shown, servicing device body 240 has an elongated, irregular shape. In some
embodiments, at least one of the fluid ports may be coupled to fluid source port 176 of fluid source 102.

Opening 258 may be any suitable shape or size. In some embodiments, opening 258 is at least of sufficient size to receive plunger 246. As shown, opening 258 is at least substantially circular having a diameter of sufficient size to receive the body of plunger 246 and radial protrusion 262 of plunger 246. In some embodiments, opening 258 extends at least substantially in an axial direction through servicing device body 240.

As shown in FIG. 8, coupling element 272 includes exterior threads 278, annular shoulder 280, annular groove 282, axial groove 284, and holes 286. Coupling element 272 may be permanently or releasably coupled to coupling member 244 with exterior threads 278. Threads 278 may be arranged in a selected pattern. In some embodiments, coupling element 272 is at least substantially complementary to coupling member 244. For example, threads 278 of are at least substantially complementary to a set of interior threads of coupling member 244.

Annular shoulder 280 may include radial slot 288. Radial slot 288 may be any suitable shape or size. In some embodiments, radial slot 288 is at least of sufficient size to receive radial protrusion 262 of plunger 246. For example, radial protrusion 262 may pass through radial slot 288 in a substantially axial direction when plunger 246 is inserted in servicing device body 240.

Annular groove 282 may be any suitable shape or size. In some embodiments, annular groove 282 is at least of sufficient size to receive radial protrusion 262. In some embodiments, radial protrusion 262 may be displaced angularly within annular groove 282. For example, axial rotation of plunger 246 may alter the angular position of radial protrusion 262 within annular groove 282 during use.

Axial groove 284 and holes 286 may be any suitable shape or size. In some embodiments, axial groove 284 and holes 286 are at least of sufficient size to receive respective portions of pins 290 (Shown in FIGS. 6, 9 and 10). As shown, axial groove 284 are at least substantially cylindrical having a diameter at least slightly larger than the diameter of pins 290. Holes 286 may be at least substantially circular having an open end for receiving pins 290 and a closed end for the supporting the pins.

Pins 290 (inhibitors) may be disposed in axial groove 284 and holes 286 of servicing device body 240. During use, when plunger body 252 is at least partially disposed in bore 256 and radial protrusion 262 is disposed in annular groove 282, pins 290 may limit the angular range of rotation of plunger 246. As shown, pins 290 pass through annular groove 282, thereby obstructing the angular path of radial protrusion 262 during use. In some embodiments, pins 290 may limit the angular range of rotation of plunger 246 to at least about 10°. In certain embodiments, pins 290 may limit the angular range of rotation of plunger 246 to at most about 180°.

Plunger 246 may be adjustable between a released position and an engaged position. In some embodiments, when plunger 246 is adjusted to the released position, integrated valve 112 is simultaneously adjusted to a closed position. In some embodiments, when plunger 246 is adjusted to the engaged position, integrated valve 112 is simultaneously adjusted to an opened position.

Coupling element 272 may be affixed or an integral part of servicing device body 240. Coupling element 272 may have an outer diameter that is less than the outer diameter of the servicing device body. Bore 256 may extend at least substantially in an axial direction through the interior of coupling element 272, servicing device body 240, and first fluid port 274. Bore 256 may include a passage of any suitable shape or size. In some embodiments, bore 256 is at least of sufficient size to receive at least a portion of plunger 246. As shown, bore 256 is at least substantially cylindrical having a diameter at least slightly larger than the diameter of the body of plunger 246. A diameter of bore 256 may be reduced as the bore enters fluid port 274. Such a reduction may form neck 292. Neck 292 may assist in directing flow into valve body 240 from fluid source 102.

Bore 256 may be in fluid communication with second fluid port 276 via passage 294. Second fluid port 276 may function as an inlet and/or an outlet. For example, second fluid port 276 may allow fluid to enter and/or exit servicing device body 240. Passage 294 may be any suitable shape or size. As shown, passage 294 is at least substantially cylindrical.

Second fluid port 276 may include bore 296 and coupling element 298. Bore 296 may be any suitable shape or size. For example, bore 296 may be at least substantially circular having a diameter of sufficient size to allow pressurized fluid to enter and/or exit servicing device body 240 at a desired rate of flow.

Coupling element 298 may be configured to couple servicing device 134 to an external device or structure. Servicing device 134 may be permanently or releasably coupled to f fluid transfer member 128. In some embodiments, coupling element 298 is at least substantially complementary to a coupling element of fluid transfer member 128. For example, coupling element 298 may include an interior surface weldable to an exterior surface of fluid transfer member 128. In some embodiments, coupling element 298 may be threads in bore 296 that are complimentary to one or more coupling members (for example, a hose fitting, and/or adaptor).

Bore 256 may be in fluid communication with first fluid port 274. First fluid port 274 may function as an inlet and/or an outlet. For example, first fluid port 274 may allow fluid to enter and/or exit servicing device body 240. First fluid port 274 may include bore 300 and coupling element 302. Bore 300 may be any suitable shape or size. For example, bore 300 may be at least substantially cylindrical having a diameter of sufficient size to allow pressurized fluid to enter and/or exit servicing device body 240 at a desired rate of flow.

Coupling element 302 may be configured to couple servicing device 134 to an external device or structure. Servicing device 134 may be permanently or releasably coupled to fluid source port 176 with coupling element 302. As shown, coupling element 302 includes threads 304. Threads 304 may be arranged in a selected thread pattern. In some embodiments, coupling element 302 is at least substantially complementary to coupling element 182 of fluid source port 176. For example, interior threads 304 may be at least substantially complementary to coupling element 182 (for example, exterior threads) of fluid source port 176.

After plunger 246 is inserted in servicing device body 240, coupling member 244 may be used to inhibit the unintentional release of fluid and/or plunger 246 from servicing device body 240. Coupling member 244 may include any suitable components. As shown, coupling member 244 includes nut 306, first gasket 308, and second gasket 310.

Nut 306 may couple to servicing device body 240. Nut 306 may include first bore 312, second bore 314, and annular shoulder 316. First bore 312 may be any suitable shape or size. First bore 312 may be at least substantially cylindrical having a diameter of sufficient size to receive at least a portion of servicing device body 240. First bore 312 includes coupling element 317 for coupling nut 306 to servicing device body 240. Coupling element 317 may include interior threads 318 arranged in a selected pattern. In some embodiments, threads 318 are at least substantially complementary to threads of a coupling element of servicing device body 240.

First bore 312 may include second bore or neck 314. Second bore 314 may be any suitable shape or size. For example, as shown in FIG. 6, second bore 314 is at least substantially cylindrical having a diameter of sufficient size to receive at least a portion of plunger 246. In some embodiments, the diameter of second bore 314 is at least slightly larger than the diameter of a portion of plunger 246. In some embodiments, the diameter of second bore 314 is sufficient to allow substantially uninhibited axial movement of plunger 246 through nut 306 and into servicing device body 240. Union of first bore 312 and second bore 314 forms shoulder 316.

Annular shoulder 316 may inhibit plunger 246 from passing through nut 306 and out of servicing device body 240, when servicing device 134 is disconnected from actuator 242.

First gasket 308 and second gasket 310 may be disposed in nut 306. Gaskets 308 and 310 may at least partially seal servicing device body 240 such that the unintentional release of a fluid from servicing device 134 is inhibited. In some embodiments, first gasket 308 is an o-ring gasket. In some embodiments, gaskets 308 and/or 310 are composed of one or more materials that are chemically inert to the fluid flowing through portions of servicing device 134. For example, first gasket 308 may be composed of a rubber and second gasket 310 may be composed of a metallic compound (e.g., stainless steel or aluminum). In some embodiments, a surface of radial protrusion 262 may abut gasket 310 to inhibit plunger 246 from sliding out of servicing device body 240.

In some embodiments, servicing device 134 may be assembled by inserting plunger 246 in servicing device body 240 and tightening nut 306 of coupling member 244 to coupling element 272 of servicing device body 240. Plunger 246 may be then coupled to actuator 242. Actuator 242 may move plunger 246 to an opened or closed position.

Figure 9:
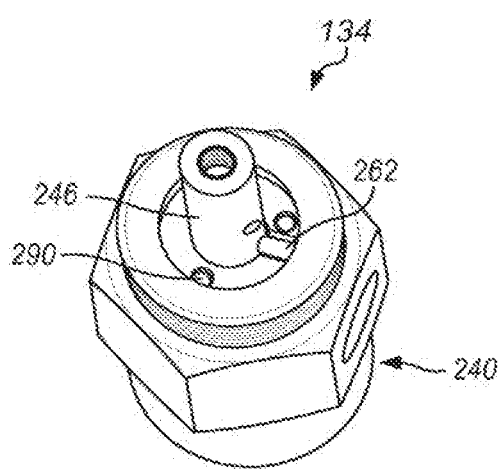
FIG. 9 is a perspective view of an embodiment of the dispensing valve portion of FIG. 8 in a released position.

In some embodiments, servicing device 134 may be connected to fluid source 102 and to fluid receiving system 104 (see, for example, FIG. 1). When attached to fluid source 102 and fluid receiving system 104, servicing device 134 may be in a closed or released position. FIG. 9 depicts a perspective top view of servicing device 134 in a released or closed position with coupling member 244 removed. In a closed or released position, protrusion 262 may be positioned above or near the surface of servicing device body 240. When plunger 246 is in a released position, plunger end 268 may be disengaged from gating device 186 of integrated valve 112 (shown in FIG. 2). Thus, plunger 246 is in a closed position. In a closed position, fluid communication between passage 266 (third fluid port) and second fluid port 276 may be established allowing a parameter of receiving system 104 to be measured. For example, a level of refrigerant and/or pressure of receiving system 104 may be determined.

Servicing device 134 may be adjusted to an engaged (open) position to allow fluid communication between first fluid port 274 and second fluid port 276. Adjusting the plunger to an engaged position may change the position of the plunger such that a first portion of the plunger engages the integrated valve with sufficient force to adjust the integrated valve from a closed position to an opened position.

Figure 10:
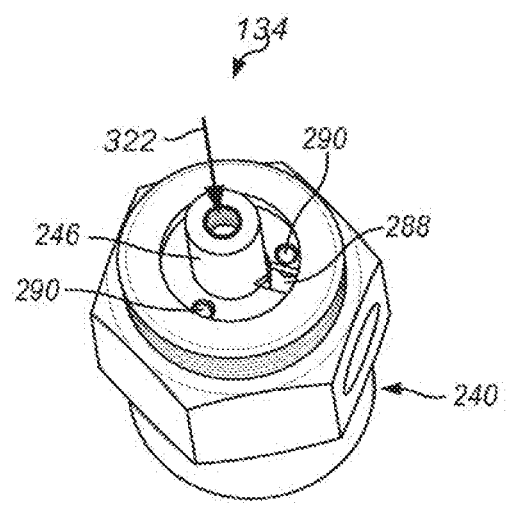
FIG. 10 is a perspective view of an embodiment of the dispensing valve portion of FIG. 9 in an engaged position.

FIG. 10 depicts a perspective view of an embodiment of plunger 246 (with coupling member 244 removed) in an engaged or open position. Actuator 242 may be turned to align protrusion 262 with radial slot 288 of servicing device body 240. Force is exerted (for example, axial force as shown by arrow 322) on plunger 246 to move protrusion 262 through radial slot 288 to allow plunger 246 to move through bore 256 until plunger end 268 engages gating device 186 of integrated valve 112. Sufficient force may be applied to fully open integrated valve 112 and allow fluid from fluid source 102 to flow to receiving system 104. In some embodiments, protrusion 262 is moved into contact with one of pins 290. Pins 290 may inhibit over-torque of plunger 246 when excessive force is applied.

In some embodiments, servicing device is coupled to a fluid source that includes an ACME thread top with a seal. Adjusting a plunger having a piercing tip to the engaged position may break and/or piece a seal of the fluid source and allow fluid to flow from the fluid source through the servicing device.

Figure 11:
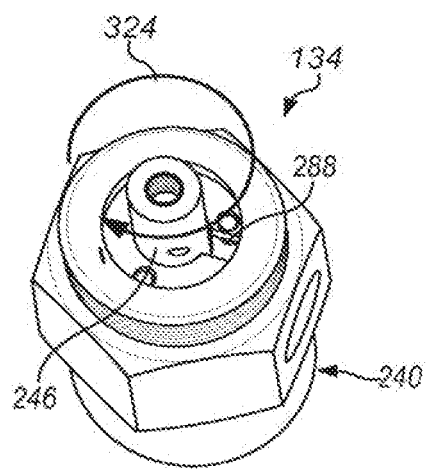
FIG. 11 is a perspective view of an embodiment of the dispensing valve portion of FIG. 9 in a locked position.

In some embodiments, plunger 246 may be a locked in an open position. FIG. 11 is a perspective view of servicing device 134 (with coupling member 244 removed) depicting plunger 246 in a locked position. Plunger 246 may be in a locked position when axial movement of the plunger is at least partially inhibited. Plunger 246 may be inhibited or be at least substantially inhibited when radial protrusion 262 is move out of alignment with radial slot 288. For example, when radial protrusion 262 is pushed in slot 288 and then rotated into annular groove 282 as shown by arrow 324. Positioning of protrusion 262 in annular groove 282 holds plunger 246 in an open position. Adjusting plunger 246 from an unlocked position to a locked position may include exerting torque on plunger 246 when radial protrusion 262 is disposed in annular groove 282, such that the radial protrusion is moved out of alignment with radial slot 288.

In some embodiments, servicing device 134 may be adapted to allow measurement of one or more parameters of the receiving system while inhibiting communication between the fluid source port and the measuring system or the fluid source port and the receiving system. Inhibiting communication to the fluid source allows the servicing device to be used to measure one or more parameters of the receiving system (for example, a refrigeration system such as an automobile refrigeration system) prior to attaching the servicing device to the fluid source (for example, a refrigerant cylinder).

Figure 12:
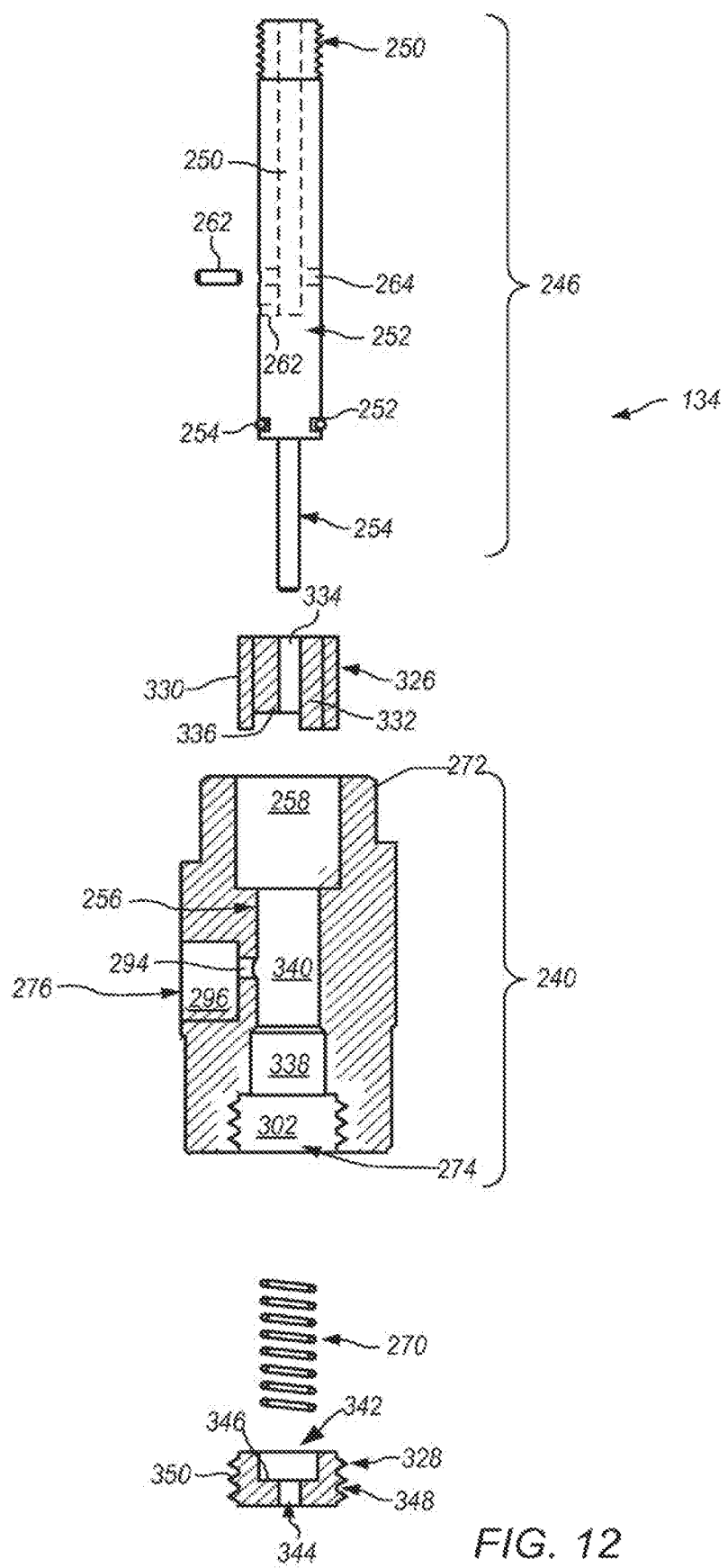
FIG. 12 is an exploded cross-sectional side view of the servicing device with a sealing member.
Figure 13A:
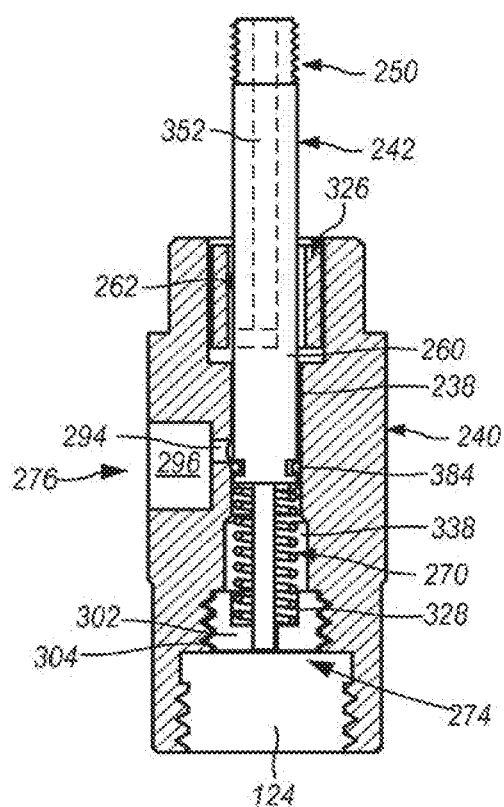
FIGS. 13A and 13B are cross-sectional side views of servicing device depicted in FIG. 12 during use.
Figure 13B:
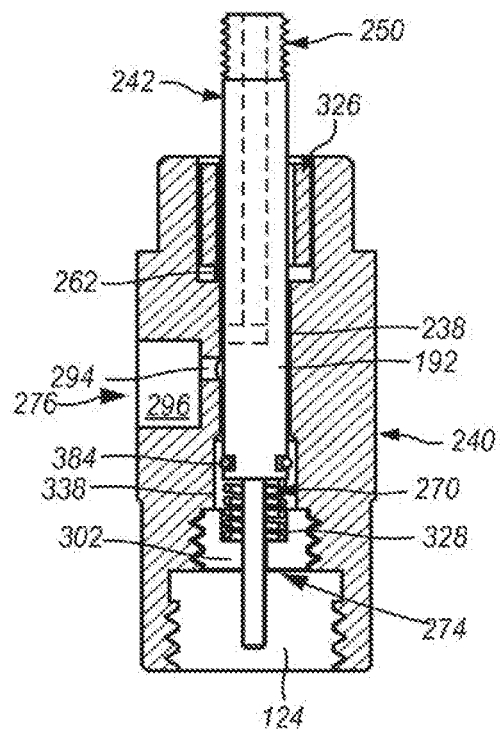

FIG. 12 is an exploded cross-sectional side view of another embodiment of servicing device 134. FIGS. 13A and 13B depict cross-sectional side views of servicing device 134 shown in FIG. 12 in various stages of use. Servicing device 134 may include servicing device body 240, plunger 246, insert 326, bias member 270, and plunger seat 328. Servicing device body 240 may include coupling element 272, opening 258, first fluid port 274, and second fluid port 276. Opening 258 is at least of sufficient size to receive insert 326. Frictional forces may retain insert 326 in opening 258. In some embodiments, opening 258 may include radial slot 288 and protrusion 262 as described in FIGS. 6-11 instead of insert 326.

Insert 326 may include insert body 330. Insert body 330 may be any suitable shape or size. As shown, insert body 330 is at least substantially cylindrical. Insert body 330 may include bore 332, slot 334, and circumferential opening 336. Bore 332 may be any suitable shape or size. As shown, bore 332 is at least substantially cylindrical. In some embodiments, bore 332 is at least of sufficient size to receive a portion of plunger body 252. In some embodiments, slot 334 may extend radially from axial bore 332 and through or substantially through insert body 330. In some embodiments, axial bore 332 extends through insert body 330 in a substantially axial direction. Radial slot 334 may be connected to opening 336. Radial slot 334 may be any suitable shape or size. In some embodiments, radial slot 334 is at least of sufficient size to receive protrusion 262 of plunger 246. For example, protrusion 262 may pass through slot 334 and into opening 336. Opening 336 may be any suitable shape or size. In some embodiments, opening 336 is at least of sufficient size to receive protrusion 262. Opening 336 may allow limited angular displacement of protrusion 262 with respect to servicing device body 240. For example, when protrusion 262 is positioned in opening 336, angular rotation of the plunger 246 may be limited to at least about 10 degrees. The angular rotation may be limited to about 10 degrees to about 90 degrees. Insert 326 may inhibit excess force (torque) to be applied to plunger 136 during use.

In some embodiments, servicing device body 240 includes bore 256 and coupling element 302. Bore 256 may be in fluid communication with opening 258 (third fluid port) and first fluid port 274. Bore 256 may varying in size and shape. For example, bore 256 may be at least substantially cylindrical. As shown, bore 256 includes portion 338 that has a diameter larger than the diameter than portion 340. One or more portions of bore 256 may be fluted. Fluting of portions of the passages and/or bore may allow sealing members to transition through the passages and/or inhibit degradation of the sealing members. In some embodiments, bore 256 is at least of sufficient size to receive at least a portion of plunger 246.

Coupling element 302 may couple plunger seat 328 to servicing device body 240. As shown, coupling element 302 includes interior threads arranged in a selected thread pattern. Coupling element 302 may be at least substantially complementary to a coupling element of plunger seat 328. Interior threads are at least substantially complementary to a set of exterior threads of plunger seat 328. It is understood that coupling element 302 includes features that are complimentary to fluid source 102 and allow servicing device 134 to be secured to the fluid source.

Plunger seat 328 may include opening 342, neck 344, and annular shoulder 346. Opening 342 may be any suitable shape or size. For example, opening 342 may be at least substantially circular having a diameter of sufficient size to receive bias member 270. Neck 344 may also be any suitable shape or size. In some embodiments, neck 344 is at least of sufficient size to receive
at least a portion of plunger 246. As shown, neck 344 is at least substantially cylindrical having a diameter at least slightly larger than the diameter of plunger shaft 254. In some embodiments, an annulus is formed between an outer surface of plunger shaft 254 and an inner surface of neck 344. The annulus may be in fluid communication with the annulus formed between an outer surface of plunger 246 and an inner surface(s) of bore 256. Annular shoulder 346 may be formed
by the union of opening 342 and neck 344. During use, bias member 270 may be at least
partially supported by annular shoulder 346.

Plunger seat 328 may be removably coupled to servicing device body 240. In some embodiments, plunger seat 328 includes coupling element 348 for coupling the plunger seat to an external device or structure. Coupling element 348 may includes exterior threads 350 arranged in a selected thread pattern. Coupling element 348 may be at least substantially complementary to coupling element 302. For example, exterior threads 350 of coupling element 348 may be at least substantially complementary to interior threads 304 of coupling element 302

Plunger 246 includes plunger body 252 and plunger shaft 254. Plunger 246 may be received by servicing device body 240. For example, at least a portion of plunger body 252 may be disposed in bore 256 of servicing device body 240. In some embodiments, at least a portion of plunger body 252 is disposed in first portion 338 of bore 256 during use. In some embodiments, at least a portion of plunger body 252 is disposed in second portion 340 of bore
256 during use. Plunger body 252 may be any suitable shape or size. As shown, plunger body 252 is at least substantially cylindrical having a diameter of at most slightly less than the diameter of bore 256. When plunger body 252 is inserted in servicing device body 240, an annulus may be formed between an outer surface of plunger body 252 and an inner surface(s) of bore 256.

Plunger body 252 may include coupling element 250, third fluid port 352, radial opening 260, radial protrusion 262, radial passage 264, sealing groove 354, and sealing member 356. Coupling element 250 may couple plunger body 252 to actuator 242 as previously described.

Sealing groove 354 may receive sealing member 356. In some embodiments, sealing groove 354 is an annular indentation formed into plunger body 252. In some embodiments, sealing member 356 is an o-ring gasket composed of one or more materials that are chemically inert to the fluid flowing through portions of servicing device 134. In some embodiments,
sealing member 356 may at least partially regulate the flow of fluid through servicing device body 240. When sealing member 356 is in portion 340 of bore 256, fluid communication between first fluid port 274 and second fluid port 276 and/or third fluid port 352 is inhibited or substantially inhibited. For example, sealing member 356 may seal a portion of bore 256 when plunger 246 is adjusted to a released position. Sealing a portion of bore 256 may be advantageous when using the integrated measuring device of actuator 242. As shown in FIG. 13A, sealing member 356 is positioned in portion 340 of bore 256 such that second fluid port 276 is isolated from first fluid port 274 while allowing fluid communication between the second fluid port 276 and third fluid port 352. As such, the integrated measuring device may provide fluid property readings in connection with only fluid receiving system 104. Thus, the integrated measuring device may provide fluid property readings in connection with fluid receiving system 104 when servicing device 134 is not coupled to fluid source 102.

As shown in FIG. 13B, advancement of plunger 246 into portion 338 of bore 256 allows fluid communication between first fluid port 274 and second fluid port 276. Advancement of plunger 246 along bore 256 may engage a portion of plunger end 268 with the portion of integrated valve 112 (not shown) of fluid source 102. Radial protrusion 262 may limit rotation of plunger 246 while traversing bore 256. Engaging plunger end 268 with an integrated valve adjusts the integrated valve from a closed position to an opened position.

In some embodiments, servicing device 134 is configured to allow fluid communication between second fluid port 276 and third fluid port 352 while inhibiting fluid communication to first fluid port 274 or allow fluid communication between second fluid port 276 and first fluid port 274 while inhibiting fluid communication between fluid port 274 and third fluid port 352.
When fluid flow is inhibited to third fluid port 352, measuring device 146 may indicate a zero or substantially zero valve.

Figure 14:
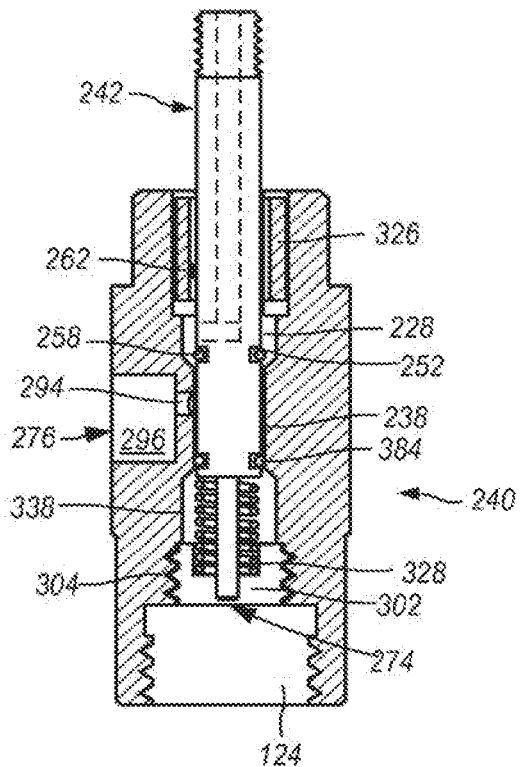
FIG. 14 is a cross-sectional side view of another embodiment of the servicing device with sealing members.

FIG. 14 is an embodiment of servicing device 134 having at least two sealing members. Bore 256 of servicing device 134 may include portion 358. Portion 358 may have a diameter
larger than portion 340 of bore 256. Plunger body 252 may include radial opening 260, radial protrusion 262, radial passage 264, fluid port 352, coupling element 250, sealing grooves 354, and sealing members 356, 360. Sealing grooves 354 may receive sealing members 356, 360. In some embodiments, sealing grooves 354 are annular indentations formed into plunger body 252. In some embodiment, sealing members 356, 360 are o-ring gaskets composed of one or more
materials that are chemically inert to the fluid flowing through portions of servicing device 134. In some embodiments, sealing members 356, 360 may at least partially regulate the flow of fluid through servicing device body 240.

Positioning of plunger 246 such that sealing member 356 is in portion 340 of bore 256 and sealing member 360 is in portion 358 of bore 256 allows fluid communication between second fluid port 276 and third fluid port 352 while inhibiting or substantially inhibiting fluid communication to first fluid port 274. Positioning of plunger 246 such that sealing member 356 is in portion 338 and sealing member 360 is in portion 340 allows fluid communication between second fluid port 276 and first fluid port 274 while inhibiting or substantially inhibiting fluid
communication to third fluid port 352. Sealing a portion of bore 256 may be advantageous when using the integrated measuring device of actuator 242. Using the servicing device 134 may allow determination of fluid properties in connection with only fluid receiving system 108 and/or during use of fluid source 102. For example, the integrated measuring device may provide fluid pressure readings of fluid receiving system 104 when servicing device 134 is not coupled to fluid source 102.

In some embodiments, a method of determining properties of a fluid receiving system may include attaching one or more servicing devices described herein to a fluid receiving system. In some embodiments, the properties of the fluid receiving system may be determined without attaching servicing device 134 to fluid source 102 (see, for example, FIGS. 12-14). A fluid port of servicing device 134 may couple to fluid receiving system 104.

In some embodiments, a refrigerant system is serviced using servicing device 134 described herein. Refrigerant system, in some embodiments, is an automobile air conditioning system. Servicing device may be coupled to refrigerant system using a hose or other suitable conduit to a low pressure side of a refrigerant system and a refrigerant fluid source. Torque may be applied to an actuator of the servicing device (for example, a handle of the servicing device may be turned and pushed) to open the servicing device and allow fluid communication between the refrigerant source and the refrigerant system. The servicing device may be locked in the open position. After a period of time, the handle turned in an opposite direction to unlock and close the servicing device. A position of the handle may be varied to regulate the flow of refrigerant from the fluid source to the refrigerant system. Once an adequate level is reached the servicing device may be disconnected from the refrigerant system and then from the fluid source.

In some embodiments, the servicing device includes a measuring device. After connecting the servicing device to the fluid source and the refrigerant system, a pressure and/or level of refrigerant of the refrigerant system may be determined using the servicing device in a closed position. If the refrigerant level is adequate, the servicing device may be disconnected. If refrigerant is required, torque may be applied to an actuator of the servicing device (for example, a handle of the servicing device may be turned and pushed) to open the servicing device and allow fluid communication between the refrigerant source and the refrigerant system. The servicing device may be locked in the open position until and refrigerant added to the refrigeration system until the measuring device indicates that sufficient refrigerant has been added.

After a period of time, the servicing device may be unlocked (for example, the handle may be turned in an opposite direction to unlock and release the servicing device). The pressure and level of refrigerant in the refrigerant system may be determined. A position of the handle may be varied to regulate the flow of refrigerant from the fluid source to the refrigerant system. Once an adequate level is reached the servicing device may be disconnected from the refrigerant system and then from the fluid source. The process or variations of the process may be repeated until the level of refrigerant in the refrigerant is adequate.

FIGS. 15 and 16 depict perspective views of refrigerant charging assemblies having a locking servicing device 134. In FIG. 15, actuator 242 may be pushed down to and rotated one-quarter turn to lock to allow fluid to flow from refrigerant source 102 to service source 104. A user may place their hand under collar 262 to allow one hand to be used to push actuator 242 downward. In FIG. 16 actuator 242 may be pushed down to lock the plunger in an open position to allow fluid to flow from refrigerant source 102 to refrigerant system 104. Button 264 may be actuated to unlock plunger 246 (for example, pushed downward).

Figure 17:
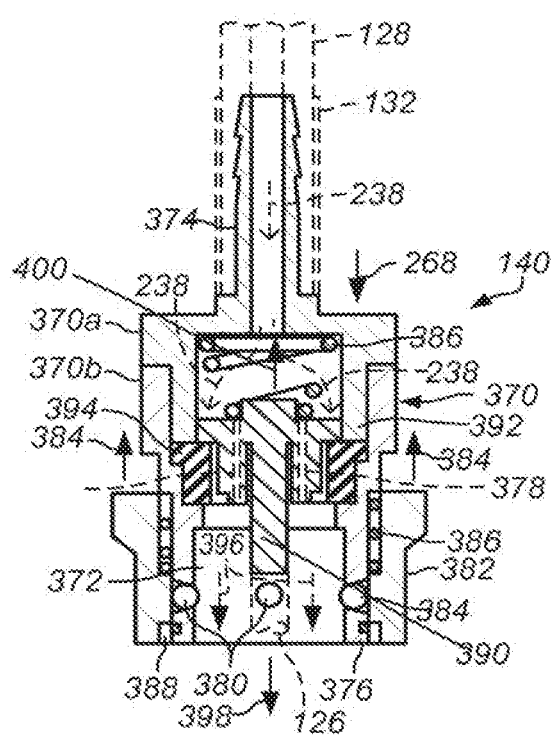
FIGS. 17 and 18 are a cross-sectional views of embodiments of disconnect coupler fittings.
Figure 18:
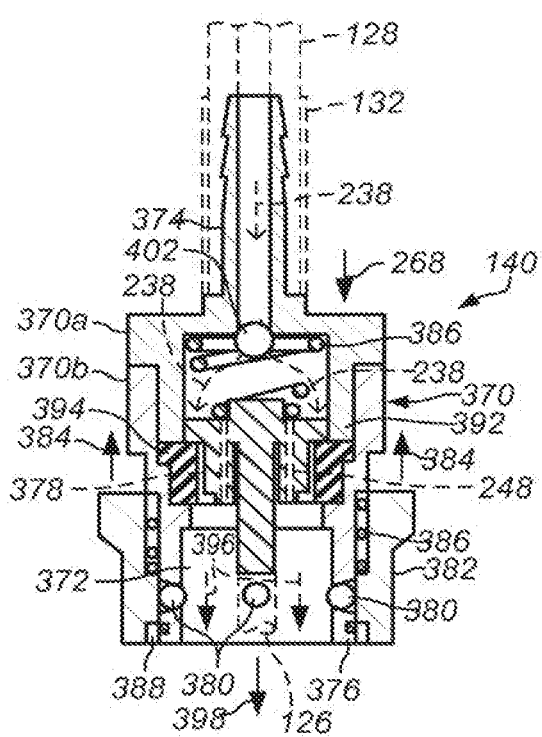

FIGS. 17 and 18 depict cross-sectional views of embodiments of disconnect coupler fitting 140. Disconnect coupler fitting 140 has tubular body portion 370 (hollow body) defined by a tubular upper body section 370a having a lower end portion telescoped and suitably anchored within the upper end portion of tubular lower body section 370b. Disconnect coupler fitting may be made of plastic and/or metal components. For example, body section 370 may be plastic and/or metal. Interior flow passage (bore) 372 within body 370 opens outwardly through hollow barbed top end inlet portion 374, and also opens outwardly through open lower end 376 of lower body section 370b. Barbed inlet portion 374 is received in end portion of fluid transfer member 128 and may be fixedly anchored thereto by tubular metal connector fitting 132.

Body section 370a (control structure) may include holes 378. Holes 378 may allow controlled leakage of fluid from fluid transfer member 128 through interior flow passage 372 when disconnect coupler fitting 140 is not connected to the refrigerant service unit. Slow and controlled leakage of fluid from fluid transfer member 128 may inhibit degradation of the conduit (for example, cracking and/or hole formation in a refrigerant hose) and/or limit heat expansion of the conduit (for example, swelling of a refrigerant hose).

A circumferentially spaced series of locking balls 380 may be carried in corresponding holes in a lower side wall portion of lower body section 370b, adjacent open lower end 376. Locking balls 380 may be radially movable between an inwardly shifted locking position in which portions of the locking balls project radially inwardly beyond the interior side surface of body section 370b, and an outwardly shifted release position (not shown) in which the radially inner sides of the locking balls are generally flush with the interior side surface of the lower body section.

Annular locking collar 382 may be coaxially and slidably mounted exteriorly on lower body section 370b and is axially movable relative between a locking position (when the bottom end of collar 382 is generally flush with lower end 376 of the lower body section) and a release position as indicated by arrows 384 (when the collar is upwardly shifted relative to the lower body section away from the locking position of the collar). Spring structure 386 may be retained between lower body section 370b and collar 382 and biases the collar downwardly toward a locking position.

Annular interior side surface recess 388 is formed in collar 382 at its lower end. With collar 382 in a locking position, recess 388 is disposed beneath balls 380. Interior side surface of collar 382, above its interior side surface recess 388, holds locking balls 380 in their locked positions. However, when collar 382 is upwardly shifted to its release position, as indicated by the arrows 384, the reduced diameter interior side surface recess 388 is brought into vertical alignment with locking balls 380 to permit the locking balls to be radially outwardly shifted to a released position.

Vertically oriented control pin member 390 is coaxially and movably received within the flow passage 372 and has radially enlarged annular sealing flange portion 392 at its top end.

Flange portion 392 overlies an inner peripheral portion of annular resilient sealing member 394 retained between facing annular ledge portions of body sections 370a, 370b. Flow passage 372 vertically extends through the interior of annular sealing member 394. Spring structure 386 may be retained within upper body section 370a. Spring structure 386 may bear downwardly against flange portion 392 and resiliently biases control pin member 390 downwardly toward the closed position in which flange portion 392 sealingly engages a radially inner upper end portion of sealing member 394 in a manner preventing fluid flow through holes 378 and/or through flow passage 372 upwardly or downwardly across the flange portion 392.

Disconnect coupler fitting 140 may be operatively connected to service fitting 106 by moving collar 382 upwardly to a released position, pushing valve body lower end 376 downwardly over service fitting 106 (shown in FIGS. 1-3), as indicated by the arrow 396 to (1) cause an upper end portion of service fitting 106 to sealingly engage sealing member 394, (2) downwardly engage control pin 390 with spring-loaded pin portion 126 of service fitting 106 (shown in FIGS. 1-3), and (3) align the locking balls 380 with service fitting exterior annular recess 124 (shown in FIGS. 1-3). Collar 382 is then released, thereby permitting spring 386 to downwardly return collar 382 to its locked position in which locking balls 380 enter annular service fitting recess 124 to sealingly and releasably lock the service fitting 106 within the interior of lower valve body section 370b beneath the sealing gasket member 394.

With the disconnect coupler fitting 140 releasably locked on the service fitting 106 in this manner, the floatingly supported control pin member 390 depresses the spring-loaded service fitting pin 126 (as indicated by the arrow 398) to open the service fitting 106. The forcible engagement between control pin member 390 and service fitting pin 126 which depresses the
service fitting pin axially and upwardly shifts control pin member 390 (as indicated by the arrow 400) to its open position in which its sealing flange portion 392 is lifted off the annular resilient sealing member 264, thereby communicating the interior of the refrigerant system 104 with the interior of the fluid transfer member 128 via the valve flow passage 372 and the opened service fitting 106.

In some embodiments, disconnect coupler fitting 140 includes a stop. FIG. 18 depicts a disconnect coupler fitting with a stop member. Disconnect coupler fitting 140 containing stop 402 may be used when fluid source 102 includes a push button valve (for example, the fluid
source in FIG. 3). Spherical stop member 402 may be floatingly disposed within interior of the body section 372 of disconnect coupler fitting 140 above the upper end of control pin member 390. Stop member 402 may be formed from a resilient material such as rubber. Floating spherical stop member 402 may inhibit upward flow of fluid through the interior of barbed outlet portion 374, when control pin member 390 is upwardly shifted, by sealingly blocking its lower
end at the onset of a fluid pressure condition which would otherwise permit such upward refrigerant flow. Stop member 402, which serves as a floating check valve element, is pressure-shifted downwardly from its FIG. 18 sealing orientation to permit the desired downward flow of fluid through the fitting 140.

In some embodiments, after connection of charging assembly 100 to fluid source 102 and refrigerant service unit 104, the refrigerant service unit (for example, an air conditioning unit) is operated in its maximum cooling mode.

In embodiments when servicing device 134 is a piercing valve, handle 160 (see FIGS. 1 and 4) may be rotated in a clockwise direction to move piercing valve stem 158 downwardly from its open position to cause pointed lower stem end 158a to pierce top end wall 110 of fluid source outlet portion 108. Valve handle 160 is then rotated in a counter-clockwise direction to return servicing device 134 to its original open position in which the interior of barbed outlet portion 150 is communicated with the interior flow passage 152 of servicing device 134, and
lower stem end 158a is upwardly removed from the puncture hole it created in fluid source outlet portion end wall 110, thereby permitting pressurized fluid (refrigerant, shown by arrows 234) to sequentially flow from fluid source 102, through interior 152 of shut-off valve servicing device 134, side outlet portion 150, fluid transfer member 128, inlet portion 244, interior 242 of
disconnect coupler fitting 140, and into interior of refrigerant system 104 via opened service fitting 106. After fluid source 102 is emptied, valve handle 160 is again turned in a clockwise direction to close servicing device 134.

In embodiments when servicing device 134 is a self-sealing valve, valve handle 160 (See, for example, FIGS. 2, 5, 6, and 19) may be rotated in a clockwise direction to move plunger 190 or plunger 246 downwardly from its open position to cause pointed a lower end of the plunger to press against gating device 186 to open the gating device fluid source 102, thereby permitting pressurized fluid (refrigerant, shown by arrows 238) to sequentially flow from fluid source 102, through interior of shut-off servicing device 134, through fluid transfer member 128, through
interior 242 of disconnect coupler fitting 140, and into interior of the refrigerant system 104 via opened service fitting 106. If locking servicing device 134 is used actuator 242 may be turned and locked into place (for example, turned about $\frac{1}{4}$ of a turn). After fluid source 102 is emptied or sufficient fluid is provided to fill refrigerant service unit, valve handle 160 is turned in a counter-clockwise direction to remove plunger 190 or unlock plunger 246 from gating device
186 and inhibiting fluid from exiting fluid source 102.

In embodiments when servicing device 134 is includes a push button, push button 116 (See, FIGS. 3 and 16) may be depressed and held or locked in place as shown in FIG. 16, thereby permitting pressurized fluid (refrigerant, shown by arrows 238 in FIG. 3) to sequentially flow
from fluid source 102, through fluid transfer member 128, through interior 372 of disconnect coupler fitting 140, and into interior of refrigerant system 104 via opened service fitting 106. After fluid source 102 is emptied or sufficient fluid is provided to fill refrigerant service unit, push button 116 is released to inhibit fluid from exiting fluid source 102.

After charging refrigerant system 104. Disconnect coupler fitting 140 may be removed from service fitting 106 by moving the coupler collar 382 upwardly, to remove the disconnect coupler fitting from the service fitting, thereby permitting service fitting pin 126 to be spring-driven upwardly to close the service fitting. Dispensing shut-off servicing device 134 may then be removed from fluid source 102.

Using this operational sequence undesirable expulsion of fluid from fluid source 102 to the atmosphere may be inhibited. This is in contrast to conventional refrigerant hose disconnect couplings which are removably connectable to the service fitting 106 that have internal control pin members (used to depress the service fitting pin 126) which are fixedly secured to the balance of the disconnect coupling in a manner such that refrigerant may always flow through the interior of the disconnect coupling.

Accordingly, if only a portion of the fluid is dispensed from the fluid source into refrigerant system 104 using a conventional charging hose assembly, and the dispensing shut-off valve is not re-closed before the disconnect coupling is removed from the service fitting, the balance of refrigerant in the pressurized fluid source will simply be discharged to atmosphere via the removed, conventionally constructed disconnect coupling.

Release of fluid to the atmosphere is inhibited by the floatingly supported control pin member 390 shown in FIG. 17. Due to the use of floatingly supported control pin member 390, even if dispensing shut-off servicing device 134 are not re-closed before disconnect coupler fitting 140 is removed from the service fitting 106, no appreciable amount of pressurized fluid remaining in fluid source 102 will be discharged to atmosphere via removed disconnect coupler fitting 140. This is due to the fact that upon the removal of disconnect coupler fitting 140 from service fitting 106, control pin member 390 is disengaged from service fitting's spring-loaded pin 126, whereupon spring 386 downwardly and axially snaps control pin member flange 392 back into sealing engagement with the annular sealing member 394 to thereby close off disconnect coupler fitting 140 and prevent the discharge of pressurized fluid (refrigerant) from its open lower end 376. It should be noted that the single resilient seal member 394 is used to operatively and sealingly engage both the pin member flange 392 and the service fitting 106 in the course of use of the specially designed disconnect coupling fitting 140.

Once disconnect coupler 140 is released from service fitting 106, fluid retained in fluid transfer member 128 may leak from holes 378. Release of fluid from fluid transfer member 128 may prevent the degradation of the conduit when the hose assembly is stored in non-temperature controlled unit (for example, a garage or building having no climate control system).

In some embodiments, servicing device 134 and disconnect coupler 140 are manufactured from materials that are resistant to the fluid in fluid source 102. For example, plastic and/or metal. In some embodiments, portions of the disconnect coupler 140 and/or servicing device 134 may be made from plastic which reduces both the weight and cost of the assembly 100.
Servicing device 134 may have plungers and/or fittings made of metal.

In some embodiments, refrigerant charging assembly includes a pressure gauge. Inclusion of a pressure gauge may allow monitoring of the level of refrigerant in the refrigerant service unit during charging. The pressure gauge may be used to monitor a refrigeration system and/or to recharge a refrigeration system with refrigerant. The pressure gauge apparatus may include a pressure scale, a pressure indicator, and indices that indicate if the amount of refrigerant in the refrigerant service unit.

In some embodiments, the pressure gauge includes a rotatable face plate. The rotatable face plate may include a temperature indicator, pressure range indicators and/or indicia. Rotation of the face plate may allow a user to point the temperature indicator at a desired temperature (e.g., ambient temperature) on the temperature scale. Positioning the temperature indicator positions the low pressure range indicator and the upper pressure range indicator to identify a desired pressure range. In some embodiments, the difference between the upper pressure indicator and the low pressure indicator may be about 1 psi, about 10 psi, about 15 psi, or about 20 psi. Pressure gauges having a temperature indicator and a rotatable face plate are described in U.S. Patent Application Publication No. 2008-0216491 to Quest et al., which is incorporated in its entirety herein by reference.

During use (e.g., during charging of a refrigeration system or during monitoring of refrigerant level of a refrigeration system), pressures below the low pressure indicator may indicate that the refrigeration system has an insufficient amount (e.g., a low charge) of refrigerant in the system. In the case of low charge, refrigerant may be added to the refrigeration system. In some embodiments, refrigeration is charged to the refrigeration system until the pressure indicator moves into the desired pressure range. Pressures in the desired range (e.g., pressures between the low pressure range indicator and the upper pressure range indicator) may indicate that a sufficient amount of refrigerant is in the system. Thus, charging of the system with refrigerant may be discontinued or is not necessary. Pressure above the upper pressure indicator may indicate that the system has been charged with too much refrigerant (e.g., over-charged). Refrigerant may be removed from the system until the pressure indicator moves into the desired pressure range.

FIG. 19 depicts a side view of an embodiment of a refrigerant charging assembly that includes a pressure gauge. FIG. 20 depicts a front view of an embodiment of the pressure gauge in FIG. 19. In some embodiments, pressure gauge apparatus 410 is a temperature compensated pressure gauge. Pressure gauge 410 may be connected in or coupled to the conduit between servicing device 134 and disconnect coupler fitting 140.

Pressure gauge apparatus 410 includes face 412, pressure scale 414, and pressure indicator 416. Pressure scale 414 includes pressure indicia in units of pressure (e.g., pounds per square inch (psi)). For example, pressure scale 414 may include indicia ranging incrementally from 0 psi to 80 psi, from 0 psi to 100 psi, or from 0 psi to 200 psi. It should be understood that any pressure scale and/or pressure units suitable for charging refrigeration systems can be used. In some embodiments, pressure gauge apparatus 410 may include one or more pressure scales. The pressure indicia may be angularly oriented with respect to the axis about which pressure indicator 416 rotates, and is properly coordinated with pressure indicator 416 so that during use an accurate pressure reading may be obtained. Pressure scale 414 may be colored to enhance readability of measured pressures.

Pressure indicator 416 may be coupled to pressure gauge using any known technique in the art to couple pressure indicators to pressure gauges (e.g., pinned, welded, epoxied). During use, pressure indicator 416 rotates to indicate the pressure of the system on pressure scale 414. For example, pressure indicator may rotate clockwise from about 0 psi to about 50 psi during charging of a refrigerant to a refrigeration system. Pressure indicator 416 may be a different color than pressure scale 414 to enhance readability of the pressure during use.

Face 412 may include text and colored sections that indicate the level of refrigerant in the system. Text between sets of pressures may indicate if the amount of refrigerant that has been charged to the refrigeration unit is sufficient. Text between a first set of pressures may read "low" to indicate the amount of refrigerant is the refrigerant service unit is low. Text between a second set of pressures may read "full" and/or "in range" to indicate the refrigerant service unit is charged. Text between a third set of pressures may read "high", "danger", and/or "alert" to indicate the refrigerant service unit is over-charged.

Pressure indication may include grip 418 to protect pressure gauge 410 from damage. Grip 418 may be manufactured from rubber.

In this patent, certain U.S. patents have been incorporated by reference. The text of such U.S. patents and U.S. patent applications is, however, only incorporated by reference to the extent that no conflict exists between such text and the other statements and drawings set forth herein. In the event of such conflict, then any such conflicting text in such incorporated by reference U.S. patents and U.S. patent applications is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A refrigerant charging assembly, comprising:
a conduit extending between a first end and a second end;
a valve releasably connectable to a fluid source and coupled to the first end of the conduit; and
a disconnect coupler fitting connected to the second end of the conduit, the disconnect coupler fitting comprising:
a hollow body releasably connectable to a refrigerant circuit service fitting; and
a control structure positioned in the hollow body and moveable between a first position, in which the hollow body is disconnected from the refrigerant circuit and the control structure sealingly engages a sealing member, and a second position, in which the hollow body engages the refrigerant circuit and the control structure defines a gap with the sealing member to allow fluid from the fluid source to flow through the gap and to the refrigerant circuit, wherein the control structure defines one or more openings that allow fluid from the conduit to vent through the control structure to atmosphere when the control structure is in the first position.

2. The refrigerant charging assembly of claim 1, wherein the valve comprises a threaded stem piercing/dispensing type valve.

3. The refrigerant charging assembly of claim 1, wherein the valve comprises a push-button aerosol can actuator valve.

4. The refrigerant charging assembly of claim 1, wherein the valve comprises a plunger, the plunger being engagable with a self-sealing valve.

5. The refrigerant charging assembly of claim 1, wherein the valve comprises a plunger, the plunger being engagable with a self-sealing valve and/or that, during use, pierces a seal of the fluid source.

6. The refrigerant charging assembly of claim 1, wherein the valve comprises a plunger that, during use, pierces a seal of the fluid source.

7. The refrigerant charging assembly of claim 1, wherein the sealing member is a hollow sealing member retained within the hollow body.

8. The refrigerant charging assembly of claim 1, wherein the sealing member is retained within the hollow body, the disconnect coupler fitting further comprising a spring structure biasing the control structure toward the first position, and wherein the sealing member has an annular configuration, and wherein the control structure comprises a pin portion for operatively engaging a depressible opening pin of the refrigerant circuit service fitting and a radially enlarged annular flange portion engagable by the spring structure and being movable along an axis into and out of sealing engagement with the sealing member.

9. The refrigerant charging assembly of claim 1, wherein the conduit comprises a flexible refrigerant charging hose.

10. The refrigerant charging assembly of claim 1 wherein the hollow body has a generally tubular configuration and a circumferentially spaced series of holes radially extending through a side wall portion thereof, and the disconnect coupler fitting further includes:
a series of locking balls radially movably carried in the holes, a locking collar exteriorly and coaxially carried on the hollow body radially outwardly of the locking balls and being axially movable relative to the hollow body between first and second positions in which the locking collar respectively: i) engages the locking balls with a first interior side surface portion of the locking collar, in a manner keeping side portions of the locking balls within the interior of the hollow body; and ii) permits the side portions of the locking balls to be forced out of the interior of the hollow body in a manner moving the locking balls into engagement with a second interior side surface portion of the locking collar; and
a spring structure resiliently biasing the locking collar toward the first position thereof.

11. The refrigerant charging assembly of claim 1, wherein the hollow body and the control structure comprise plastic material.

12. The refrigerant charging assembly of claim 1, wherein the hollow body and the control structure comprise metal and/or plastic material.

13. The refrigerant charging assembly of claim 1, wherein at least one of the openings is positioned in a base of the control structure.

14. The refrigerant charging assembly of claim 1, wherein the control structure comprises a pin and wherein at least one of the openings is in the pin of the control structure.

15. The refrigerant charging hose assembly of claim 1, further comprising a pressure gauge, the pressure gauge being coupled to the conduit, the valve, and the disconnect coupler fitting.

16. A disconnect coupler fitting for use on a refrigerant charging assembly, the disconnect coupler fitting comprising:
a hollow body releasably connectable to a refrigerant circuit service fitting; and
a control structure positioned in the hollow body and moveable between a first position, in which the hollow body is disconnected from the refrigerant circuit and the control structure sealingly engages a sealing member, and a second position, in which the hollow body engages the refrigerant circuit and the control structure defines a gap with the sealing member to allow refrigerant to flow through the gap and to the refrigerant circuit, wherein the control structure defines one or more openings that allow fluid to vent through the control structure to atmosphere when the control structure is in the first position.

17. A method of servicing a refrigerant service unit, comprising:

providing a refrigerant charging assembly having a conduit extending between a first end and a second end, a valve releasably connectable to a fluid source and coupled to the first end of the conduit, and a disconnect coupler fitting connected to the second end of the conduit, the disconnect coupler fitting comprising:

a hollow body releasably connectable to a refrigerant circuit service fitting; and a control structure positioned in the hollow body and moveable between a first position, in which the hollow body is disconnected from the refrigerant circuit and the control structure sealingly engages a sealing member, and a second position, in which the hollow body engages the refrigerant circuit and the control structure defines a gap with the sealing member to allow refrigerant from the fluid source to flow through the gap and to the refrigerant circuit, wherein the control structure defines one or more openings that allow fluid from the conduit to vent through the control structure to atmosphere when the control structure is in the first position; and allowing fluid to flow from the fluid source, through the refrigerant charging assembly, and to refrigerant service unit;

disconnecting the refrigerant charging assembly from at least the refrigerant service unit; and allowing of fluid from the conduit to vent through the control structure to atmosphere.

18. The method of claim 17, wherein conduit comprises a flexible hose and wherein allowing fluid from the conduit to vent through the control structure to atmosphere inhibits expansion of the hose.

19. A refrigerant charging apparatus comprising:

a conduit extending between a first end and a second end;

a servicing device coupled to the first end of the conduit and comprising a valve at least partially disposed in a passage of the servicing device and engagable with a fluid source, wherein the servicing device valve is adjustable between a released position and an engaged position; and a disconnect coupler fitting connected to the second end of the conduit, the disconnect coupler fitting comprising a body and a control structure positioned in the body, the control structure moveable between a first position, in which the body is disconnected from a refrigerant circuit and the control structure sealingly engages a sealing member, and a second position, in which the body engages the refrigerant circuit and the control structure defines a gap with the sealing member to allow refrigerant from the fluid source to flow through the gap and to the refrigerant circuit, wherein the control structure defines one or more openings that allow refrigerant from the conduit to vent through the control structure to atmosphere when the control structure is in the first position.

20. The refrigerant charging apparatus of claim 19, wherein when the servicing device valve is in the engaged position, the servicing device valve is lockable.

* * * * *